US012777370B2

(12) United States Patent
Xu et al.

(10) Patent No.: US 12,777,370 B2
(45) Date of Patent: Oct. 27, 2026

(54) COMMUNICATION METHOD AND COMMUNICATION APPARATUS

(71) Applicant: HUAWEI TECHNOLOGIES CO., LTD., Shenzhen (CN)

(72) Inventors: Bin Xu, Beijing (CN); Bingzhao Li, Beijing (CN); Zhenzhen Cao, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

(21) Appl. No.: 18/427,829

(22) Filed: Jan. 31, 2024

(65) Prior Publication Data

US 2024/0179560 A1 May 30, 2024

Related U.S. Application Data

(63) Continuation of application No. PCT/CN2022/098589, filed on Jun. 14, 2022.

(30) Foreign Application Priority Data

Aug. 5, 2021 (CN) ......................... 202110898747.3

(51) Int. Cl.
*H04W 28/06* (2009.01)
*H04J 3/06* (2006.01)
*H04W 36/00* (2009.01)

(52) U.S. Cl.
CPC ........... *H04W 28/06* (2013.01); *H04J 3/0667* (2013.01); *H04W 36/0033* (2013.01)

(58) Field of Classification Search
CPC .. H04W 28/06; H04W 36/0033; H04J 3/0667
See application file for complete search history.

(56) References Cited

U.S. PATENT DOCUMENTS

2003/0156559 A1* 8/2003 Yi ......................... H04W 36/10 370/331

FOREIGN PATENT DOCUMENTS

CN 111742577 A 10/2020
CN 112930695 A 6/2021
(Continued)

OTHER PUBLICATIONS

"3rd Generation Partnership Project; Technical Specification Group Radio Access Network; Evolved Universal Terrestrial Radio Access Network (EUTRAN); Architecture description (Release 12)", 3GPP Draft; 3GPP TS 36.401 V12.2.0, Draft 36401-C20. 3rd Generation Partnership Project (3GPP), Mobile Competence Centre; 650, Route Des Lucioles; F-06921 Sophia-Antipolis Cedex; France, Mar. 16, 2015 (Mar. 16, 2015), XP050953646, Total pages.
(Continued)

*Primary Examiner* — Joseph A Bednash

(57) ABSTRACT

This application provides a communication method and a communication apparatus. The method includes: A target access network device determines that a first terminal device is handed over from a source access network device to the target access network device; and sends first information to the first terminal device, where the first information indicates a first packet header compression context, and the first packet header compression context is for compressing or decompressing a packet header of a data packet. In this application, the target access network device sends, to the first terminal device, the first information indicating the first packet header compression context, so that in a handover scenario, the first terminal device can correctly decompress a subsequently received data packet with a compressed packet header. This helps improve communication reliability.

16 Claims, 14 Drawing Sheets

(56) References Cited

FOREIGN PATENT DOCUMENTS

| | | | | |
|---|---|---|---|---|
| KR | 20100029319 A | * | 3/2010 | ............ H04W 28/06 |
| WO | 2020092124 A1 | | 5/2020 | |

OTHER PUBLICATIONS

3GPP TS 38.323 V16.4.0, 3rd Generation Partnership Project; Technical Specification Group Radio Access Network; NR; Packet Data Convergence Protocol (PDCP) specification (Release 16), Jun. 2021, total 38 pages.

3GPP TSG-RAN WG2 Meeting #109bis-e, R2-2003665, Agenda Item: 7.3.2.1, Sharp, RoHC handling for inter-gNB and intra-gNB DAPS handover, Electronic, Apr. 20-Apr. 30, 2020, total 5 pages.

3GPP TS 38.331 V16.5.0, 3rd Generation Partnership Project; Technical Specification Group Radio Access Network; NR; Radio Resource Control (RRC) protocol specification (Release 16), Jun. 2021, total 964 pages.

3GPP TSG-RAN WG2 Meeting #110e, R2-2004947, Agenda item: 7.3.2, Qualcomm Inc, DAPS handover UP remaining key issues, E-Meeting: Jun. 1-9, 2020, total 4 pages.

3GPP TS 36.323 V16.4.0, 3rd Generation Partnership Project; Technical Specification Group Radio Access Network; Evolved Universal Terrestrial Radio Access (E-UTRA); Packet Data Convergence Protocol (PDCP) specification (Release 16), Sep. 2021, total 55 pages.

* cited by examiner

SDAP layer: Service data adaptation layer
PDCP layer: Packet data convergence protocol layer
RLC layer: Radio link control layer
MAC layer: Media access control layer
PHY layer: Physical layer

COMMUNICATION METHOD AND COMMUNICATION APPARATUS

CROSS-REFERENCE TO RELATED APPLICATIONS

This application is a continuation of International Application No. PCT/CN2022/098589, filed on Jun. 14, 2022, which claims priority to Chinese Patent Application No. 202110898747.3, filed on Aug. 5, 2021. The disclosures of the aforementioned applications are hereby incorporated by reference in their entireties.

TECHNICAL FIELD

This application relates to the field of communication technologies, and in particular, to a communication method and a communication apparatus.

BACKGROUND

Multicast broadcast services (MBSs) are services, such as a live broadcast service, a public safety service, and a batch software update service, oriented to a plurality of terminal devices (user equipment, UE). MBS data comes from a data server. First, the data server sends the MBS data to a core network device, then the core network device sends the MBS data to an access network device, and finally the access network device sends the MBS data to at least one UE that receives the MBS service. The MBS service is sent from the core network device to the access network device through a common transmission channel, namely, an MBS session. The MBS service may be sent from the access network device to the UE in two transmission manners: first, a point-to-multipoint (PTM) transmission manner; and second, a point-to-point (PTP) transmission manner.

Generally, because a location of a terminal device that performs wireless communication moves, the terminal device often needs to be handed over from one access network device (namely, a source access network device) to another access network device (namely, a target access network device) to continue wireless communication. For an MBS service, the source access network device and the target access network device independently send the MBS service. For some MBS services such as voice services, to reduce transmission overheads, the access network device enables a header compression function of an MBS data packet, and two access network devices (to be specific, the source access network device and the target access network device) independently perform header compression. However, for a terminal device that receives the MBS service, when the terminal device is handed over from the source access network device to the target access network device, because processes of establishing header compression contexts by the two access network devices are independent of each other, the compression context established by the source access network device cannot be used to perform packet header decompression on a data packet transmitted by the target access network device. Based on this, how to ensure normal communication between the terminal device and the target access network device after the handover becomes one of urgent problems to be resolved.

SUMMARY

This application provides a communication method and a communication apparatus, to ensure normal communication between a terminal device and a target access network device after handover, so that communication reliability is improved.

According to a first aspect, this application provides a communication method. The method is applicable to a target access network device. The method includes: determining that a first terminal device is handed over from a source access network device to a target access network device; and sending first information to the first terminal device, where the first information indicates a first packet header compression context, and the first packet header compression context is for compressing or decompressing a packet header of a data packet.

In this application, when a terminal device (where for example, the first terminal device is used as an example for description) is handed over from the source access network device to the target access network device due to location movement, the target access network device may send the first information to the first terminal device, so that the first terminal device can establish the first packet header compression context based on the received first information, to maintain synchronization of packet header compression contexts between the first terminal device and the target access network device. This ensures that after the first terminal device is handed over to the target access network device, the data packet with the compressed packet header can be normally decompressed, and this improves communication reliability. A time point when the first terminal device is handed over from the source access network device to the target access network device described above may be in a process in which the first terminal device is handed over from the source access network device to the target access network device, or may be after the first terminal device is handed over from the source access network device to the target access network device. In other words, the target access network device may send the first information to the first terminal device in the process in which the first terminal device is handed over from the source access network device to the target access network device, or may send the first information to the first terminal device after the first terminal device is handed over from the source access network device to the target access network device. This is not limited herein. The data packet in this application may be a data packet of an MBS service (where for example, the data packet may be a data packet with an uncompressed packet header or a data packet with a compressed packet header). This is not limited herein. The data packet in this application may be a data packet associated with the MBS service.

In a possible implementation, the method further includes:

stopping using a header compression context used, before the first terminal device is handed over from the source access network device to the target access network device, by the target access network device to compress or decompress the packet header of the data packet; and establishing the first packet header compression context.

In this application, after the first terminal device is handed over and before the target access network device sends the first information to the first terminal device, the target access network device may stop using the packet header compression context that has been established in the target access network device (which is alternatively understood as deleting, resetting, refreshing, skipping using, not using, or no longer using the packet header compression context that has been established in the target access network device), that is, the target access network device no longer sends a data packet on which packet header compression is performed based on a packet header compression context that has been established before (to be specific, before the first terminal device is handed over), instead, the target access network device sends a data packet with an uncompressed packet header when a data packet needs to be sent. Further, the target access network device establishes (which is alternatively described as re-establishing) a new packet header compression context (namely, the first packet header compression context), and sends the first packet header compression context to the first terminal device. To be specific, the target access network device re-starts a process of establishing the packet header compression context, and after determining that first packet header compression contexts are synchronized between the first terminal device and the target access network device, sends a data packet on which header compression is performed based on the first packet header compression context. The entire procedure is easy to operate and highly applicable.

In a possible implementation, the method further includes:

suspending using the first packet header compression context to compress the packet header of the data packet, where the first packet header compression context is a header compression context used, before the first terminal device is handed over from the source access network device to the target access network device, by the target access network device to compress or decompress the packet header of the data packet.

In this application, after the first terminal device is handed over and before the target access network device sends the first information to the first terminal device, the target access network device may suspend using a packet header compression context that has been established in the target access network device (which is alternatively understood as skipping using, temporarily not using, or disabling the packet header compression context that has been established in the target access network device, or understood as setting a state of the packet header compression context that has been established in the target access network device to an unavailable state or an invalid state). To be specific, the target access network device temporarily does not send a data packet on which packet header compression is performed based on a packet header compression context that has been established before the first terminal device is handed over, but sends a data packet with an uncompressed packet header. Further, when a specific condition is met subsequently (for example, it is determined that the packet header compression contexts are synchronized between the first terminal device and the target access network device), the first terminal device resumes using (which is alternatively understood as using or enabling the packet header compression context that has been established in the target access network device, or understood as setting the state of the packet header compression context that has been established in the target access network device to an available state or an effective state) the packet header compression context that has been established before the first terminal device is handed over to perform packet header compression, and sends a data packet with a compressed packet header to the terminal device. This can also ensure that the terminal device can correctly decompress the data packet with the compressed packet header, and is easy to operate and is high applicable.

In a possible implementation, the method further includes:

determining that the first terminal device establishes the first packet header compression context; and resuming using the first packet header compression context to compress or decompress the packet header of the data packet.

In this application, when it is determined that the first terminal device establishes the first packet header compression context, it may be considered that the packet header compression contexts are synchronized between the first terminal device and the target access network device. Therefore, the target access network device may resume using the packet header compression context established before the first terminal device is handed over to perform packet header compression, and send the data packet with the compressed packet header to the terminal device.

In a possible implementation, the method further includes:

receiving feedback information from the first terminal device, where the feedback information indicates that the first terminal device establishes the first packet header compression context; and the determining that the first terminal device establishes the first packet header compression context includes:

determining, based on the feedback information, that the first terminal device establishes the first packet header compression context.

In this application, the feedback information may include a header compression context identifier, where one header compression context identifier corresponds to one first packet header compression context. Therefore, after the target access network device receives the feedback information from the first terminal device, the target access network device may determine, based on the header compression context identifier in the feedback information, that the first terminal device has established (or successfully established) the first packet header compression context corresponding to the header compression context identifier.

In a possible implementation, the sending first information to the first terminal device includes:

sending the first information to the first terminal device in a point-to-point PTP transmission manner.

In this application, after the first terminal device is successfully handed over from the source access network device to the target access network device, the target access network device may send the first information to the first terminal device in the PTP transmission manner, so that after the handover, the first terminal device can correctly decompress a compressed header data packet (namely, the data packet with the compressed packet header) received from the target access network device.

In a possible implementation, the sending the first information to the first terminal device in a PTP transmission manner includes:

sending a media access control control element MAC CE to the first terminal device in the PTP transmission manner, where the MAC CE comprises the first information; or sending radio resource control RRC signaling to the first terminal device in the PTP transmission manner, where the RRC signaling comprises the first information.

In this application, the first information may be carried in a MAC CE, RRC signaling, or a packet data convergence protocol control protocol data unit (namely, a PDCP control PDU) and sent to the first terminal device. This is not limited herein, and operation flexibility is high.

In a possible implementation, the method further includes:

sending a data packet with a compressed packet header to the first terminal device in a point-to-multipoint PTM transmission manner and/or the point-to-point PTP transmission manner.

In this application, after the first terminal device is successfully handed over from the source access network device to the target access network device, the target access network device may send data packets to the terminal device by using both a PTP transmission path and a PTM transmission path. Specifically, the target access network device may send the data packet with the uncompressed packet header to the first terminal device based on the PTP transmission manner, and send the data packet with the compressed packet header based on the PTM manner. If sending by using both transmission paths is not allowed, to be specific, the target access network device can send only the data packets by using one transmission path, for the first terminal device during implementation, the target access network device may send the data packet with the uncompressed packet header to the first terminal device in the PTP manner, to help the handed-over first terminal device establish a header compression context, and may send the data packet with the compressed packet header to the first terminal in the PTP manner, to ensure that a progress of receiving the data packet by the first terminal device in the PTP manner is not slower than a progress of receiving a data packet by another terminal device in the PTM manner.

In a possible implementation, the sending first information to the first terminal device includes:

sending the first information to the first terminal device via the source access network device, where the first information is carried in a handover command.

In this application, when the first terminal device is handed over from the source access network device to the target access network device, the target access network device may send the first information to the first terminal device via the source access network device. Specifically, the target access network device may carry the first information in a handover request acknowledgment message and send the handover request acknowledgment message to the source access network device. After receiving the handover request acknowledgment message, the source access network device sends the first information to the first terminal device based on the handover command. It may be understood that, sending the first information to the first terminal device in the handover procedure can save transmission resources and improve communication efficiency, and it is ensured that after the handover, the first terminal device can correctly decompress the compressed header data packet (namely, the data packet with the compressed packet header) received from the target access network device.

According to a second aspect, this application provides a communication method. The method is applicable to a first terminal device. The method includes: performing handover from a source access network device to a target access network device; and receiving first information from the target access network device, where the first information indicates a first packet header compression context, and the first packet header compression context is for compressing or decompressing a packet header of a data packet.

In a possible implementation, the method further includes:

sending feedback information to the target access network device, where the feedback information indicates that the first terminal device successfully establishes the first packet header compression context.

In a possible implementation, the receiving first information from the target access network device includes:

receiving the first information from the target access network device in a point-to-point PTP transmission manner.

In a possible implementation, the receiving the first information from the target access network device in a PTP transmission manner includes:

receiving a media access control control element MAC CE from the target access network device in the PTP transmission manner, where the MAC CE includes the first information; or receiving radio resource control RRC signaling from the target access network device in the PTP transmission manner, where the RRC signaling includes the first information.

In a possible implementation, the method further includes:

receiving a data packet with a compressed packet header from the target access network device in a point-to-multipoint PTM transmission manner and/or the point-to-point PTP transmission manner.

In a possible implementation, the first header compression context is carried in a data packet with an uncompressed packet header, the data packet with the uncompressed packet header corresponds to a first sequence number, the data packet with the compressed packet header corresponds to a second sequence number, and the first sequence number is the same as the second sequence number; and the method further includes:

discarding the data packet with the compressed packet header.

In this application, in a repeated detection function of the handed-over first terminal device, whether a packet header of a data packet is compressed needs to be considered. Specifically, when the first terminal device receives two data packets including a same sequence number, the first terminal device needs to determine whether packet headers of the two data packets are compressed. If one packet header is compressed and the other packet header is not compressed, a data packet with the compressed packet header is discarded; or if both packet headers are compressed or both packet headers are not compressed, a data packet received later is discarded.

In a possible implementation, the data packet with the compressed packet header includes a header compression context identifier; and the method further includes:

before the first terminal device establishes the first header compression context corresponding to the header compression context identifier, storing the data packet with the compressed packet header; and decompressing the data packet with the compressed packet header based on the first header compression context corresponding to the header compression context identifier.

In this application, before the first terminal device establishes the first header compression context corresponding to the header compression context identifier, the compressed header data packet is stored, and the corresponding data packet with the compressed packet header is not decompressed until the corresponding header compression context is established.

In a possible implementation, the receiving first information from the target access network device includes:

receiving the first information sent by the target access network device via the source access network device, where the first information is carried in a handover command.

According to a third aspect, this application provides a communication apparatus. The apparatus may be a target access network device. The apparatus includes: a processing unit, configured to determine that a first terminal device is handed over from a source access network device to the target access network device; and a transceiver unit, configured to send first information to the first terminal device, where the first information indicates a first packet header compression context, and the first packet header compression context is for compressing or decompressing a packet header of a data packet.

In a possible implementation, the processing unit is further configured to:

stop using a header compression context used, before the first terminal device is handed over from the source access network device to the target access network device, by the target access network device to compress or decompress the packet header of the data packet; and establish the first packet header compression context.

In a possible implementation, the processing unit is further configured to:

suspend using the first packet header compression context to compress the packet header of the data packet, where the first packet header compression context is a header compression context used, before the first terminal device is handed over from the source access network device to the target access network device, by the target access network device to compress or decompress the packet header of the data packet.

In a possible implementation, the processing unit is further configured to:

determine that the first terminal device establishes the first packet header compression context; and resume using the first packet header compression context to compress or decompress the packet header of the data packet.

In a possible implementation, the transceiver unit is further configured to receive feedback information from the first terminal device, where the feedback information indicates that the first terminal device establishes the first packet header compression context; and the processing unit is further configured to: determine, based on the feedback information, that the first terminal device establishes the first packet header compression context.

In a possible implementation, the transceiver unit is configured to:

send the first information to the first terminal device in a point-to-point PTP transmission manner.

In a possible implementation, the transceiver unit is specifically configured to:

send a media access control control element MAC CE to the first terminal device in the PTP transmission manner, where the MAC CE comprises the first information; or send radio resource control RRC signaling to the first terminal device in the PTP transmission manner, where the RRC signaling includes the first information.

In a possible implementation, the transceiver unit is further configured to:

send a data packet with a compressed packet header to the first terminal device in a point-to-multipoint PTM transmission manner and/or the point-to-point PTP transmission manner.

In a possible implementation, the transceiver unit is further configured to:

send the first information to the first terminal device via the source access network device, where the first information is carried in a handover command.

According to a fourth aspect, this application provides a communication apparatus. The apparatus may be a first terminal device. The apparatus includes: a processing unit, configured to perform handover from a source access network device to a target access network device; and a transceiver unit, configured to receive first information from the target access network device, where the first information indicates a first packet header compression context, and the first packet header compression context is for compressing or decompressing a packet header of a data packet.

In a possible implementation, the transceiver unit is further configured to:

send feedback information to the target access network device, where the feedback information indicates that the first terminal device successfully establishes the first packet header compression context.

In a possible implementation, the transceiver unit is configured to:

receive the first information from the target access network device in a point-to-point PTP transmission manner.

In a possible implementation, the transceiver unit is specifically configured to:

receive a media access control control element MAC CE from the target access network device in the PTP transmission manner, where the MAC CE includes the first information; or receive radio resource control RRC signaling from the target access network device in the PTP transmission manner, where the RRC signaling includes the first information.

In a possible implementation, the transceiver unit is further configured to:

receive a data packet with a compressed packet header from the target access network device in a point-to-multipoint PTM transmission manner and/or the point-to-point PTP transmission manner.

In a possible implementation, the first header compression context is carried in a data packet with an uncompressed packet header, the data packet with the uncompressed packet header corresponds to a first sequence number, the data packet with the compressed packet header corresponds to a second sequence number, and the first sequence number is the same as the second sequence number; and the processing unit is further configured to:

discard the data packet with the compressed packet header.

In a possible implementation, the data packet with the compressed packet header includes a header compression context identifier; and the processing unit is further configured to:

before the first terminal device establishes the first header compression context corresponding to the header compression context identifier, store the data packet with the compressed packet header; and decompress the data packet with the compressed packet header based on the first header compression context corresponding to the header compression context identifier.

In a possible implementation, the transceiver unit is further configured to:

receive the first information sent by the target access network device via the source access network device, where the first information is carried in a handover command.

According to a fifth aspect, this application provides a communication apparatus. The apparatus may be an access network device (for example, a target access network device), an apparatus in the access network device, or an apparatus that can be used together with the access network device. The communication apparatus may alternatively be a chip system. The communication apparatus may perform the method according to the first aspect. A function of the communication apparatus may be implemented by hardware, or may be implemented by hardware executing corresponding software. The hardware or the software includes one or more units or modules corresponding to the foregoing function. The unit or module may be software and/or hardware. For operations performed by the communication apparatus and beneficial effects thereof, refer to the method in the first aspect and the beneficial effects thereof. Repeated parts are not described again.

According to a sixth aspect, this application provides a communication apparatus. The apparatus may be a terminal device (for example, a first terminal device), an apparatus in the terminal device, or an apparatus that can be used together with the terminal device. The communication apparatus may alternatively be a chip system. The communication apparatus may perform the method according to the second aspect. A function of the communication apparatus may be implemented by hardware, or may be implemented by hardware executing corresponding software. The hardware or the software includes one or more units or modules corresponding to the foregoing function. The unit or module may be software and/or hardware. For operations performed by the communication apparatus and beneficial effects thereof, refer to the method in the second aspect and the beneficial effects thereof. Repeated parts are not described again.

According to a seventh aspect, this application provides a communication apparatus. The apparatus may be an access network device (for example, a target access network device). The communication apparatus includes a processor and a transceiver, and the processor and the transceiver are configured to execute a computer program or instructions stored in at least one memory, to enable the apparatus to implement the method according to any one of the first aspect.

According to an eighth aspect, this application provides a communication apparatus. The apparatus may be an access network device (for example, a target access network device). The communication apparatus includes a processor, a transceiver, and a memory. The processor, the transceiver, and the memory are coupled; and the processor and the transceiver are configured to implement the method according to any one of the first aspect.

According to a ninth aspect, this application provides a communication apparatus. The apparatus may be a terminal device (for example, a first terminal device). The communication apparatus includes a processor and a transceiver, and the processor and the transceiver are configured to execute a computer program or instructions stored in at least one memory, to enable the apparatus to implement the method according to any one of the first aspect.

According to a tenth aspect, this application provides a communication apparatus. The apparatus may be a terminal device (for example, a first terminal device). The communication apparatus includes a processor, a transceiver, and a memory. The processor, the transceiver, and the memory are coupled; and the processor and the transceiver are configured to implement the method according to any one of the first aspect.

According to an eleventh aspect, this application provides a computer-readable storage medium. The storage medium stores a computer program or instructions, and when the computer program or the instructions are executed by a computer, the method according to either of the first aspect and the second aspect is implemented.

According to a twelfth aspect, this application provides a computer program product including instructions. The computer program product includes computer program code, and when the computer program code is run on a computer, the method according to either of the first aspect and the second aspect is implemented.

DESCRIPTION OF EMBODIMENTS

The following clearly and completely describes the technical solutions in embodiments of this application with reference to the accompanying drawings in embodiments of this application.

In descriptions of this application, unless otherwise specified, "/" means "or". For example, A/B may represent A or B. "And/or" in this specification describes only an association relationship for describing associated objects and represents that there may be three relationships. For example, A and/or B may represent the following three cases: Only A exists, both A and B exist, and only B exists. In addition, "at least one" means one or more, and "a plurality of" means two or more. Words such as "first" and "second" do not limit a quantity and an execution sequence, and the words such as "first" and "second" do not indicate a definite difference.

In this application, words such as "example" or "for example" are used to give an example, an illustration, or descriptions. Any embodiment or design scheme described as an "example" or "for example" in this application should not be explained as being more preferred or having more advantages than other embodiments or design schemes. Exactly, use of the words such as "example" or "for example" is intended to present a related concept in a specific manner.

The technical solutions in embodiments of this application may be applied to various communication systems, for example: a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system or a new radio (NR) system, and a future communication system. This is not limited herein.

For ease of understanding, the 5G communication system is used as an example in this embodiment of this application. The following describes related network elements in the 5G communication system in detail.

Figure 1A:
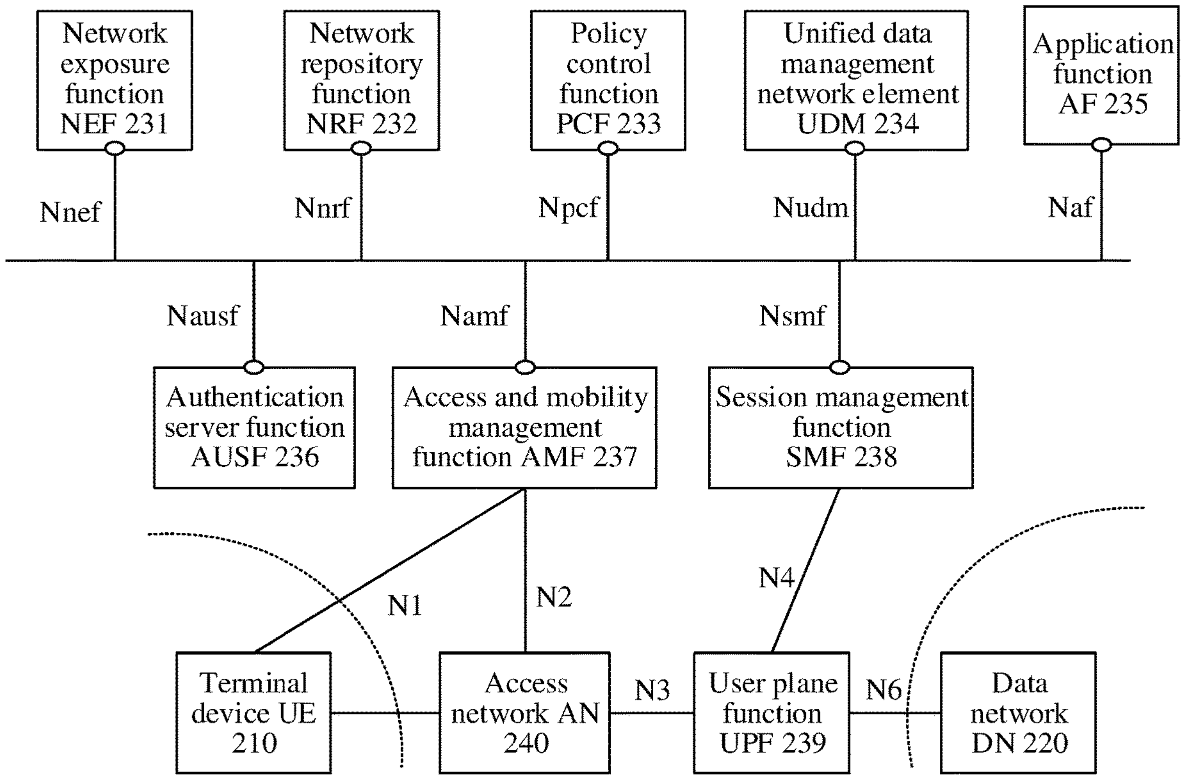
FIG. 1*a* is a schematic diagram of a 5G network architecture.

FIG. 1*a* is a schematic diagram of a 5G network architecture according to an embodiment of this application. As shown in FIG. 1*a*, the network architecture may include a terminal device part, a (radio) access network ((R)AN), a core network (CN), and a data network (DN). The (R)AN (described as a RAN below) is configured to connect the terminal device to a wireless network, and the CN is configured to manage the terminal device and provide a gateway for communicating with the DN.

The following separately describes in detail the terminal device, the RAN, the CN, and the DN in FIG. 1*a*.

1. Terminal Device

The terminal device part in FIG. 1*a* includes a terminal device 210, and the terminal device 210 may also be referred to as user equipment (UE). The terminal device 210 in this embodiment of this application is a device with a wireless transceiver function, and may communicate with a network element of one or more core networks (CNs) by using an access network device in an access network (AN) 240. The terminal device 210 may also be referred to as an access terminal, a terminal, a subscriber unit, a subscriber station, a mobile station, a remote station, a remote terminal, a mobile device, a user terminal, a wireless network device, a user agent, a user apparatus, or the like. The terminal device 210 may be deployed on land, including indoor, outdoor, handheld, or vehicle-mounted forms, or may be deployed on a water surface (such as a ship), or may be deployed in air (for example, on an airplane, a balloon, or a satellite). The terminal device 210 may be a cellular phone, a cordless phone, a session initiation protocol (SIP) phone, a smartphone, a mobile phone, a wireless local loop (WLL) station, a personal digital assistant (PDA), a handheld device having a wireless communication function, a computing device or another device connected to a wireless modem, a vehicle-mounted device, a wearable device, an unmanned aerial vehicle device, a terminal in the internet of things or the internet of vehicles, a terminal of any form in a 5th generation mobile communication (5th generation, 5G) network and a future network, a relay user equipment, a terminal in a future evolved public land mobile communication network (public land mobile network, PLMN), or the like, where the relay user equipment may be, for example, a 5G residential gateway (RG). For example, the terminal device 210 may be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like. This is not limited in this embodiment of this application.

2. RAN

As shown in FIG. 1*a*, the RAN includes an access network device 240. It should be noted that, the RAN may include one or more RAN devices (or access network devices), and interfaces between the access network devices and the terminal device may be Uu interfaces (or referred to as air interfaces). It is clear that, in future communication, names of these interfaces may remain unchanged, or may be replaced with other names. This is not limited in this application.

The access network device is a node or a device that enables the terminal device to access the wireless network. For example, the access network device includes but is not limited to: a next-generation base station (generation NodeB, gNB), an evolved NodeB (eNB), a next-generation evolved NodeB (next generation eNB, ng-eNB), a wireless backhaul device, a radio network controller (RNC), a NodeB (NodeB, NB), a base station controller (BSC), a base transceiver station (BTS), a home base station ((home evolved NodeB, HeNB) or (home NodeB, HNB)), a baseband unit (BBU), a transmission reception point (transmission reception point, TRP), a transmission point (TP), and a mobile switching center in the 5G communication system. This is not limited herein. In addition, the access network device may alternatively be a base station in a 6G communication system, or an open base station (Open RAN) or a cloud base station (Cloud RAN). In the Open RAN, an interface between access network devices or within an access network device in the present invention may become an internal interface of the Open RAN. Procedures and information exchange between these internal interfaces may be implemented by using software or a program. Therefore, the technical solutions of the present invention are also applicable to an Open RAN architecture. Provided that an implementation idea of a solution is the same as or similar to that of the solution of the present invention, the solution falls within the protection scope of the present invention. In this embodiment of this application, the access network device may be a base station. This is used as an example to describe the solution provided in this embodiment of this application.

(1) Protocol Layer Structure

Communication between the access network device and the terminal device complies with a specific protocol layer structure. For example, a control plane protocol layer structure may include a radio resource control (RRC) layer, a packet data convergence protocol (PDCP) layer, a radio link control (RLC) layer, a media access control (MAC) layer, and a physical layer (PHY). A user plane protocol layer structure may include a PDCP layer, an RLC layer, a MAC layer, and a physical layer. In a possible implementation, a service data adaptation protocol (SDAP) layer may be further included above the PDCP layer.

Data transmission between the access network device and the terminal device is used as an example. The data transmission needs to go through the user plane protocol layer such as the SDAP layer, the PDCP layer, the RLC layer, the MAC layer, and the physical layer. The SDAP layer, the PDCP layer, the RLC layer, the MAC layer, and the physical layer are also collectively referred to as an access stratum. For example, at least one data radio bearer (DRB) is established between the access network device and the terminal device for data transmission. Each DRB may correspond to a set including a group of functional entities, for example, including one PDCP layer entity, at least one RLC layer entity corresponding to the PDCP layer entity, at least one MAC layer entity corresponding to the at least one RLC layer entity, and at least one physical layer entity corresponding to the at least one MAC layer entity. It should be noted that at least one signaling radio bearer (SRB) may be established between the access network device and the terminal device for signaling transmission. The DRB and the SRB are collectively referred to as a radio bearer (RB). In other words, processing of a data packet at all layers in the access network device and the terminal device combined may be referred to as the radio bearer. Each piece of data in the radio bearer needs to be processed at all layers, and each layer has a corresponding functional entity, for example, a PDCP entity at the PDCP layer, to perform a corresponding function.

Figure 1B:
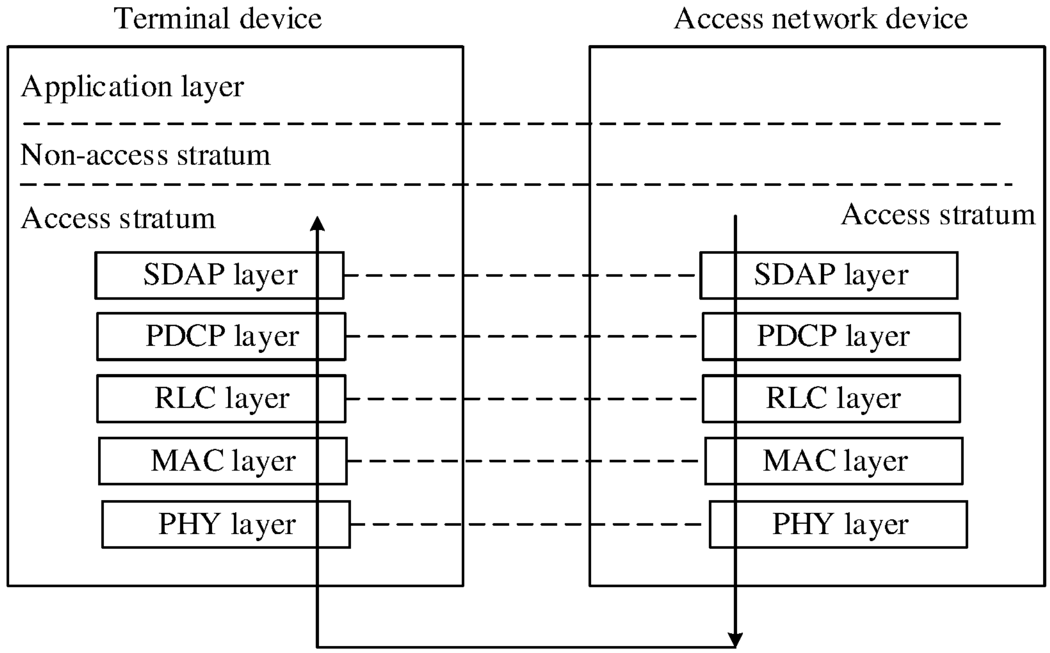
FIG. 1*b* is a schematic diagram of downlink data transmission between layers.

Downlink data transmission is used as an example. FIG. 1*b* is a schematic diagram of downlink data transmission between layers. In FIG. 1*b*, a downward arrow represents data sending, and an upward arrow represents data receiving. After obtaining data from an upper layer, the SDAP layer entity may map the data to a PDCP layer entity of a corresponding DRB based on a quality of service flow indicator (QOS flow indicator, QFI) of the data. The PDCP layer entity may transmit the data to at least one RLC layer entity corresponding to the PDCP layer entity, and then the at least one RLC layer entity transmits the data to a corresponding MAC layer entity. Then, the MAC layer entity generates a transport block, and a corresponding physical layer entity wirelessly transmits the transport block. The data is correspondingly encapsulated at each layer. Data received by a layer from an upper layer of the layer is considered as a service data unit (SDU) of the layer. After being encapsulated at the layer, the data becomes a protocol data unit (PDU), and is then transferred to a next layer. For example, data received by the PDCP layer entity from an upper layer is referred to as a PDCP SDU, and data sent by the PDCP layer entity to a lower layer is referred to as a PDCP PDU. Data received by the RLC layer entity from an upper layer is referred to as an RLC SDU, and data sent by the RLC layer entity to a lower layer is referred to as an RLC PDU. Data may be transmitted between different layers through corresponding channels. For example, data may be transmitted between the RLC layer entity and the MAC layer entity through a logical channel (LCH), and data may be transmitted between the MAC layer entity and the physical layer entity through a transport channel. It may be understood that, the downlink data may be MBS service data, for example, may be live service data, public safety service data, or batch software update service data. This is not limited herein. In other words, for the MBS service, data is transmitted from the access network device to the terminal device.

For example, it can be further learned from FIG. 1*b* that, the terminal device further has an application layer and a non-access stratum. The application layer may be used to provide a service for an application installed on the terminal device. For example, downlink data received by the terminal device may be sequentially transmitted from a physical layer to the application layer, and then is provided by the application layer for the application. For another example, the application layer may obtain data generated by the application, sequentially transmit the data to a physical layer, and send the data to another communication apparatus. The non-access stratum may be used to forward user data. For example, the non-access stratum forwards uplink data received from the application layer to the SDAP layer, or forwards downlink data received from the SDAP layer to the application layer.

(2) CU and DU

Figure 1C:
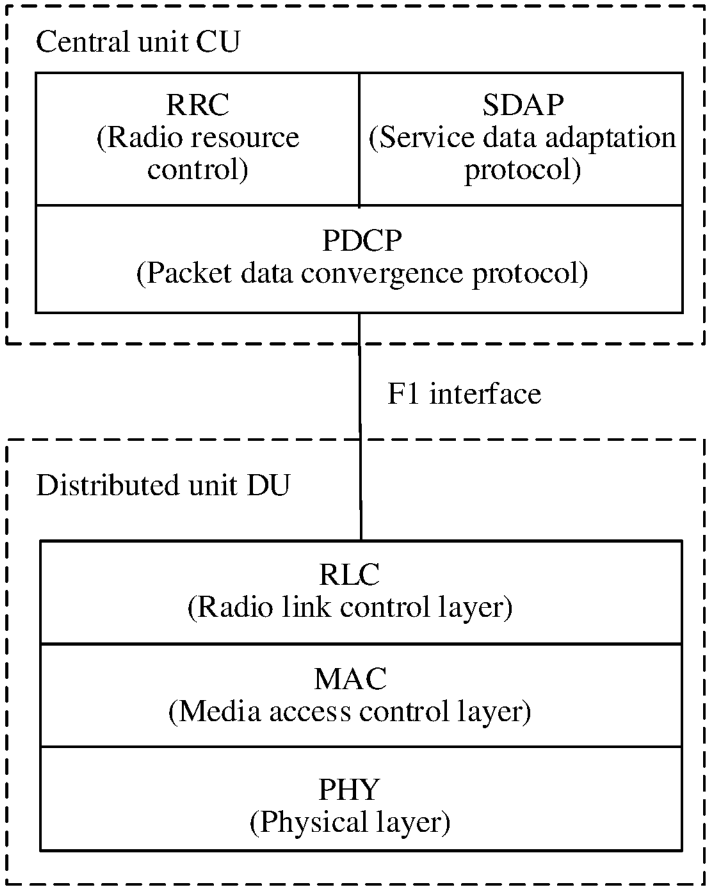
FIG. 1*c* is a schematic diagram of a CU-DU split architecture.

In this embodiment of this application, the access network device may include one or more central units (CUs) and one or more distributed units (DUs). A plurality of DUs may be controlled by one CU in a centralized manner, or one DU may be connected to a plurality of CUS. For example, an interface between the CU and the DU may be referred to as an F1 interface. A control plane (CP) interface may be an F1-C interface, and a user plane (UP) interface may be an F1-U interface. The CU and the DU may be obtained through division based on protocol layers of the wireless network, for example, as shown in FIG. 1*c*. FIG. 1*c* is a schematic diagram of a CU-DU split architecture. Functions of the PDCP layer and a layer above the PDCP layer are set in the CU, and functions of protocol layers below the PDCP layer (such as the RLC layer and the MAC layer) are set in the DU.

It may be understood that, division of processing functions of the CU and the DU based on the protocol layers is merely an example, and the processing functions may alternatively be divided in another manner. For example, functions of protocol layers above the RLC layer are set on the CU, and functions of the RLC layer and protocol layers below the RLC layer are set on the DU. For another example, the CU or the DU may have functions of more protocol layers through division. For still another example, the CU or the DU may alternatively have some processing functions of protocol layers through division. In a design, some functions of the RLC layer and functions of the protocol layers above the RLC layer are set on the CU, and remaining functions of the RLC layer and functions of the protocol layers below the RLC layer are set on the DU. In another design, division of functions of the CU or the DU may alternatively be performed based on service types or other system requirements. For example, division may be performed based on latencies. Functions whose processing time needs to meet a latency requirement are set on the DU, and functions whose processing time does not need to meet the latency requirement are set on the CU. In another design, the CU may alternatively have one or more functions of the core network. For example, the CU may be set on a network side for ease of centralized management; and the DU may have a plurality of radio frequency functions, or radio frequency functions may be set remotely. This is not limited in this embodiment of this application.

Figure 1D:
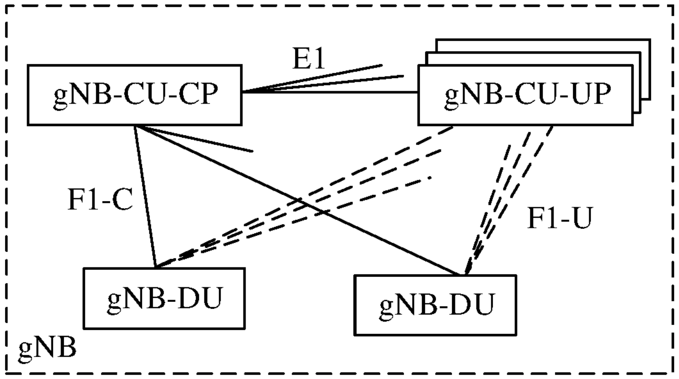
FIG. 1*d* is a schematic diagram of another CU-DU split architecture.

For example, the functions of the CU may be implemented by one entity, or may be implemented by different entities. For example, as shown in FIG. 1*d*, FIG. 1*d* is a schematic diagram of another CU-DU split architecture. Functions of the CU may be further divided, to be specific, a control plane and a user plane are split, and are implemented by using different entities: a control plane CU entity (namely, a CU-CP entity) and a user plane CU entity (namely, a CU-UP entity). The CU-CP entity and the CU-UP entity may be coupled to the DU, to jointly complete functions of the RAN device. An interface between the CU-CP entity and the CU-UP entity may be an E1 interface, an interface between the CU-CP entity and the DU may be an F1-C interface, and an interface between the CU-UP entity and the DU may be an F1-U interface. One DU and one CU-UP may be connected to one CU-CP. Under control of a same CU-CP, one DU may be connected to a plurality of CU-UPs, and one CU-UP may be connected to a plurality of DUs.

Figure 1E:
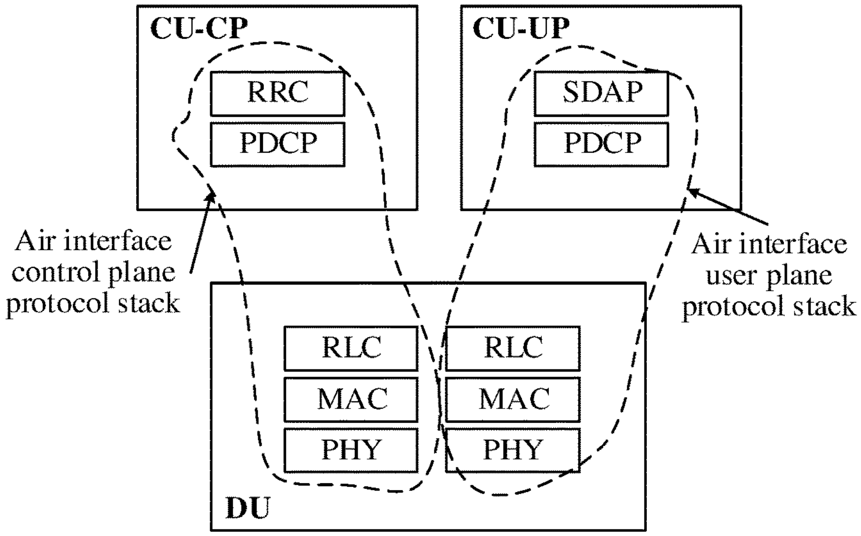
FIG. 1*e* is a schematic diagram of distribution of air interface protocol stacks.

Based on FIG. 1*d*, FIG. 1*e* is a schematic diagram of distribution of air interface protocol stacks. As shown in FIG. 1*e*, for both the user plane and the control plane, an air interface protocol stack may be that the RLC layer, the MAC layer, and the PHY layer are on the DU, and the PDCP layer and the protocol layer above the PDCP layer are on the CU.

It should be noted that, in the architecture shown in FIG. 1*c* to FIG. 1*e*, signaling generated by the CU may be sent to the terminal device through the DU, or signaling generated by the terminal device may be sent to the CU through the DU. The DU may transparently transmit the signaling to the terminal device or the CU by directly encapsulating the signaling at the protocol layers without parsing the signaling. In the following embodiments, if transmission of the signaling between the DU and the terminal device is involved, sending or receiving the signaling by the DU is applicable to this scenario. For example, signaling at the RRC layer or the PDCP layer is finally processed into data at the physical layer and sent to the terminal device, or is converted from received data at the physical layer. In this architecture, the signaling at the RRC layer or the PDCP layer may also be considered as being sent by the DU, or being sent by the DU and a radio frequency apparatus.

3. CN

As shown in FIG. 1*a*, the CN includes a network exposure function (NEF) 231, a network repository function (NRF) 232, a policy control function (policy control function, PCF) 233, a unified data management (UDM) network element 234, an application function (AF) 235, an authentication server function (AUSF) 236, an access and mobility management function (AMF) 237, a session management function (SMF) 238, a user plane function (UPF) 239, and a (radio) access network device. For ease of description, an access network device (which may also be referred to as a base station) mentioned below in embodiments of this application is described by using the RAN as an example. A core network device mentioned below in embodiments of this application may be understood as a general term of CN function network elements.

The AMF network element is a control plane network element provided by a carrier network, and is responsible for access control and mobility management for accessing the carrier network by the terminal device, for example, including functions such as mobility status management, temporary mobile subscriber identity allocation, and user authentication and authorization.

The SMF network element is a control plane network element provided by the carrier network and is responsible for managing a PDU session of the terminal device. The PDU session is a channel for transmitting a PDU, and the terminal device and the DN need to perform PDU transmission through the PDU session. The SMF network element is responsible for establishment, maintenance, deletion, and the like of the PDU session. The SMF network element includes functions related to a session, for example, session management (for example, session establishment, modification, and release, including maintenance of a tunnel between the UPF and the RAN), selection and control of the UPF network element, service and session continuity (service and session continuity, SSC) mode selection, and roaming.

The UPF network element is a gateway provided by a carrier, and is a gateway for communication between the carrier network and the DN. The UPF network element includes functions related to the user plane, for example, data packet routing and transmission, packet detection, quality of service (QOS) processing, lawful interception, uplink packet detection, and downlink data packet storage.

The PCF network element is a control plane function provided by the carrier, and is configured to provide a PDU session policy for the SMF network element. The policy may include a charging-related policy, a QoS-related policy, an authorization-related policy, and the like.

The AF network element is a function network element providing various services, can interact with the core network through another network element, and can interact with a policy management framework to perform policy management.

In addition, although not shown, the CN may further include another possible network element, for example, a network exposure function (NEF) network element or a unified data repository (UDR) network element.

4. DN

As shown in FIG. 1*a*, a data network DN 220 may also be referred to as a packet data network (PDN), and is usually a network, for example, a third-party network, outside the carrier network. The carrier network may access a plurality of data networks DNs 220. A plurality of services may be deployed on the data network DN 220, and the data network DN 220 may provide services such as data and/or voice services for the terminal device 210. For example, the data network DN 220 may be a private network of a smart factory, a sensor installed in a workshop of the smart factory may be the terminal device 210, a control server of the sensor is deployed in the data network DN 220, and the control server may provide a service for the sensor. The sensor may communicate with the control server, to obtain instructions of the control server, transmit collected sensor data to the control server according to the instructions, and the like. For another example, the data network DN 220 may be an internal office network of a company, a mobile phone or a computer of an employee of the company may be the terminal device 210, and the mobile phone or the computer of the employee may access information, data resources, and the like on the internal office network of the company.

In FIG. 1*a*, Nnef, Nausf, Nnrf, Namf, Npcf, Nudm, Nsmf, Naf, N1, N2, N3, N4, and N6 are sequence numbers of interfaces. For meanings of these sequence numbers of the interfaces, refer to related standard protocols. This is not limited herein.

It may be understood that, the 5G communication system is used as an example for illustration in FIG. 1*a*. The solutions in embodiments of this application are applicable to another possible communication system, for example, an LTE communication system or a future 6th generation (6G) communication system. The foregoing network elements or functions may be network elements in a hardware device, may be software functions run on dedicated hardware, or may be virtualized functions instantiated on a platform (for example, a cloud platform). Optionally, the network elements or the functions may be implemented by one device, or may be jointly implemented by a plurality of devices, or may be one function module in one device. This is not specifically limited in embodiments of this application.

The following describes a service data transmission procedure by using an example in which the data network DN is the multicast broadcast service (Multicast and Broadcast Service, MBS). It may be understood that, the MBS is a service oriented to a plurality of UEs, for example, a live service, a public safety service, or a batch software update service.

Figure 2:
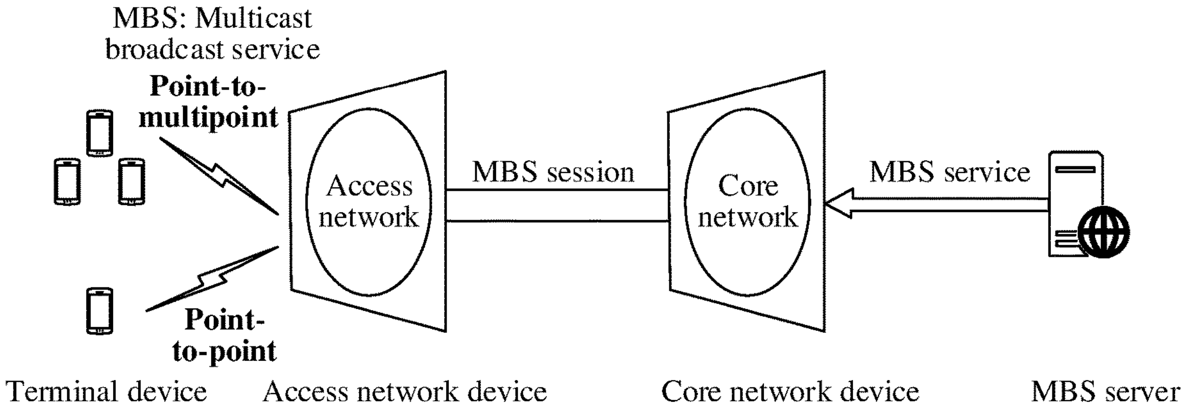
FIG. 2 is a schematic diagram of an MBS service transmission process.

FIG. 2 is a schematic diagram of an MBS service transmission process. As shown in FIG. 2, MBS data (where for example, the MBS data may be live service data, public safety service data, or batch software update service data) comes from a data server. First, the data server sends the MBS data to a core network device, then the core network device sends the MBS data to an access network device, and finally the access network device sends the MBS data to at least one UE that receives an MBS service. The MBS service is sent from a core network to the access network device through a common transmission channel MBS session. The MBS service may be sent from the access network device to the UE in two transmission manners: first, a PTM (point-to-multipoint) transmission manner; and second, a PTP (point to point, point-to-point) transmission manner. Correspondingly, for a terminal device, the terminal device may receive a data packet from the access network device in the PTM transmission manner, or receive a data packet from the access network device in the PTP transmission manner.

Further, to make embodiments of this application clearer, the following explains and describes related technical features in embodiments of this application. It should be noted that these explanations are intended to make embodiments of this application easier to understand, but should not be considered as a limitation on the protection scope claimed in this application.

1. Data Packet Header Compression (Also Referred to as Header Compression)

A basic principle of data packet header compression is reducing a size of a packet header by deleting an original field in the packet header or replacing the original field in the packet header with a shorter field. In a wireless communication system, there are mainly two packet header compression algorithms: first, a robust header compression (robust header compression, ROHC) algorithm for a packet header of an IP data packet; and second, an Ethernet packet header compression (ethernet header compression, EHC) algorithm for a packet header of an Ethernet data packet. Principles of the two algorithms are similar, and compression processing is performed at a PDCP layer. For ease of understanding, the compression processing procedure is described by using the ROHC algorithm as an example.

A compression end on a transmitting side and a decompression end on a receiving side generate and store context information (or described as a context) for compression and decompression in advance, where each context corresponds to one context identifier (CID). To be specific, in a start phase of data transmission, the transmitting side sends a complete IP packet header and a corresponding context identifier to the receiving side. In subsequent transmission, the transmitting side needs to send only a dynamically changing part of the packet header of the data packet, and does not need to send a semi-static part or a static part with a high repetition probability. The decompression end restores the semi-static part or the static part based on the stored context information, to restore the complete packet header of the data packet and deliver the complete packet header of the data packet to an upper layer. In an ideal situation, the packet header compression contexts are always synchronized between the transmitting end and the receiving end, so that information compressed at the transmitting side can be losslessly restored at the receiving side. Generally, if a compression function is enabled on the transmitting side, correspondingly, a decompression function is enabled on the receiving side. In other words, the compression function and the decompression function are enabled or disabled at the same time. In this embodiment of this application, a network device that enables the compression function may be referred to as a compression end, and a network device that enables the decompression function is referred to as a decompression end (also referred to as a decompression end).

Generally, the compression end performs header compression on data packet headers that include different contents or information by using different contexts. A quantity of contexts is controlled by a maximum context identifier (maxCID) parameter. If a new packet header cannot match an established context, but there is no available context identifier, the compression end may choose to reuse an existing context (for example, a context that is not used for long time), that is, establish a new context to overwrite the existing context; or the compression end may not compress the new data packet header (that is, a data packet with an uncompressed packet header is sent).

2. Handover Technology

Figure 3:
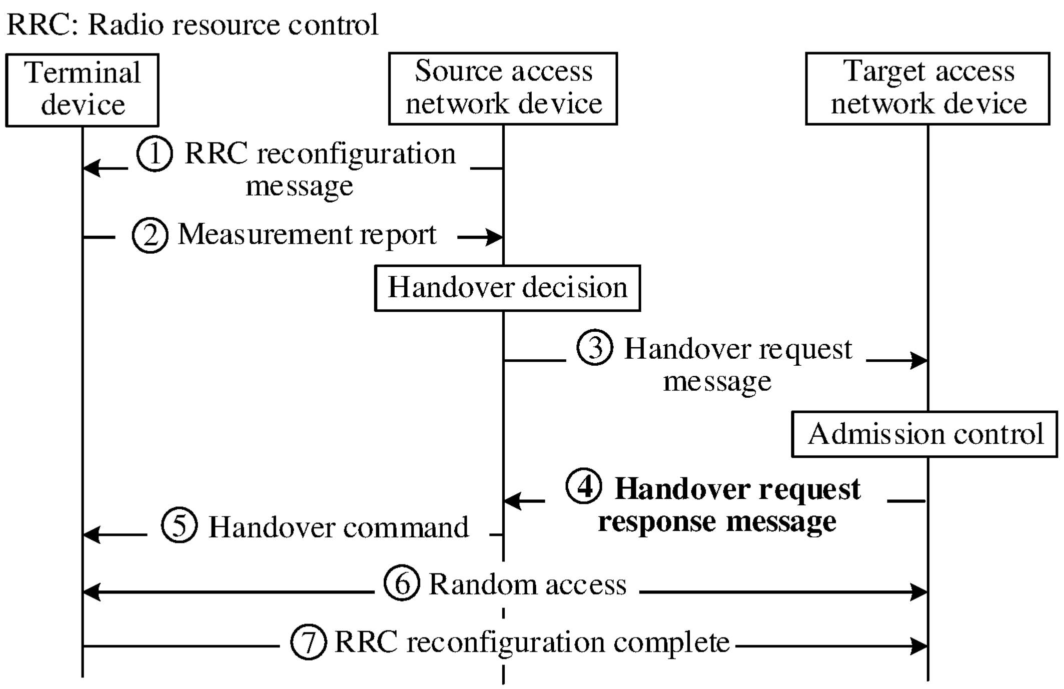
FIG. 3 is a schematic diagram of a handover procedure.

In a mobile communication system, mobility management of UE in a connected mode is controlled by a network device. To be specific, the network device sends a handover message to indicate a cell to which the UE is to be handed over and a handover method. For ease of understanding, refer to FIG. 3. FIG. 3 is a schematic diagram of a handover procedure. As shown in FIG. 3, after receiving the handover message, the UE accesses a target cell based on content included in the handover message. Therefore, successful sending of the handover message is a necessary condition for ensuring successful handover in a conventional handover mechanism. Specifically, the handover procedure includes the following steps.

Step ①: A source access network device sends an RRC reconfiguration message to the UE in the connected mode, where the RRC reconfiguration message includes parameters such as a measurement object, a report configuration, and a measurement identifier.

Step ②: After measuring a series of cells based on the received RRC reconfiguration message, the UE generates a measurement report and reports the measurement report to the currently connected source access network device.

Step ③: After receiving the measurement report reported by the UE, the source access network device determines whether the UE needs to be handed over (that is, the source access network device makes a handover decision). If determining that the UE needs to be handed over, the source access network device sends a handover request message to a target access network device.

Step ④: After the target access network device receives the handover request message sent by the source access network device, the target access network device determines, based on a situation such as a quantity of connections of the target access network device, whether to allow access of the UE (that is, the target access network device performs admission control). If the access of the UE is allowed, the target access network device sends a handover request response message (or described as a handover acknowledgment message or a handover request acknowledgment message) to the source access network device, where the handover request response message includes parameters such as a cell radio network temporary identifier (C-RNTI) of a new cell, and an algorithm related to security of the target access network device.

Step ⑤: After receiving the handover request response message sent by the target access network device, the source access network device may send a handover command to the UE, where the handover command may include the parameters in the handover request response message in step ④, that is, it is equivalent to that a layer of the source access network device is transparent. Specifically, the handover command in a 5G system includes related information about the target cell and a related configuration parameter required for the UE to access the target cell. For example, the handover command includes information about the target cell (for example, a physical cell identifier (PCI) of the target cell and frequency information corresponding to the target cell (for example, a frequency corresponding to the target cell, where specifically, in the 5G system, for content included in the frequency information, refer to specific descriptions of FrequencyInfoDL IE in the protocol TS 38.331)), a C-RNTI allocated by the target cell to the UE, random access channel (RACH) resource information (for example, a dedicated RACH resource and/or a common RACH resource) required for accessing the target cell, and the like.

Step ⑥: The UE initiates random access to the target access network device according to the handover command.

Step ⑦: The UE sends an RRC reconfiguration complete message to the target access network device.

Figure 4:
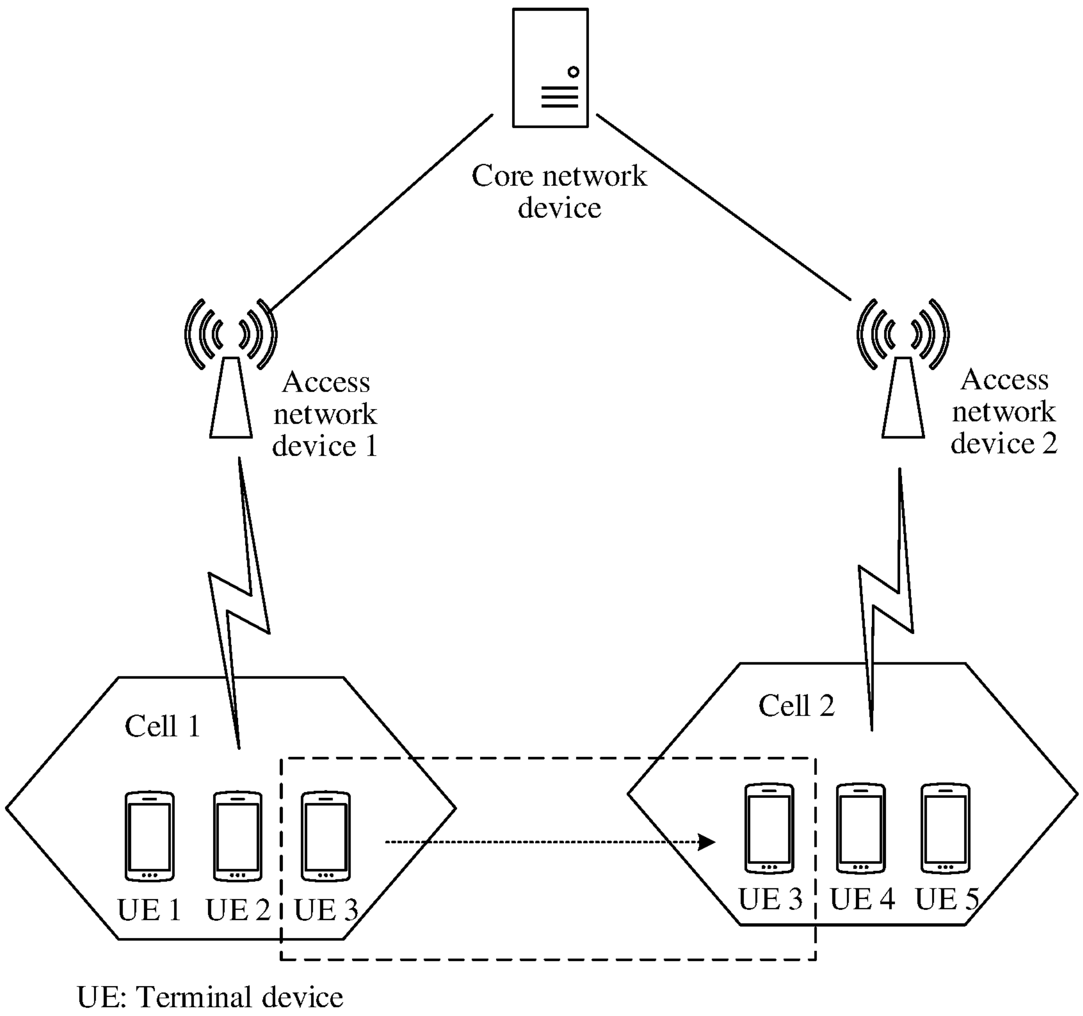
FIG. 4 is a schematic diagram of a scenario in which UE receiving a multicast broadcast service performs handover.

It may be understood that, because the UE that receives the multicast broadcast service moves, the UE often needs to be handed over from one access network device to another access network device to continue to receive the multicast broadcast service. For example, refer to FIG. 4. FIG. 4 is a schematic diagram of a scenario in which UE receiving a multicast broadcast service performs handover. As shown in FIG. 4, a core network device may send multicast broadcast service data packets to different access network devices (an access network device 1 and an access network device 2 shown in FIG. 4), so that each access network device may send a data packet to at least one UE included in a cell corresponding to the access network device. For example, as shown in FIG. 4, the access network device 1 may send data packets to UE 1, UE 2, and UE 3 in a cell 1 in a PTM transmission manner, and the access network device 2 may also send data packets to UE 4 and UE 5 in a cell 2 in the PTM transmission manner. When the UE 3 moves, for example, when a location of the UE 3 moves from the cell 1 to the cell 2, the UE 3 needs to be handed over from the access network device 1 to the access network device 2 to continue to receive the multicast broadcast service data packet. The access network device 1 is the source access network device, and the access network device 2 is the target access network device.

For the MBS service, the source access network device and the target access network device independently send the MBS service. For some MBS services such as voice services, to reduce transmission overheads, the access network device enables a header compression function of an MBS data packet, and two access network devices independently perform header compression. However, for UE that receives the MBS service, when the UE is handed over from the source access network device to the target access network device, because processes of establishing header compression contexts by the two access network devices are independent of each other, the compression context established by the source access network device cannot be used to perform packet header decompression on a data packet transmitted by the target access network device. Therefore, how to ensure that the UE can normally receive the MBS service after the handover becomes one of urgent problems to be resolved.

Based on this, an embodiment of this application provides a communication method. The method can implement normal communication in a handover scenario, and helps improve communication reliability. The method in this embodiment of this application is not only applicable to compression and transmission of a packet header part of a data packet, but also applicable to compression and transmission of a payload part of a data packet, and is applicable to compression and transmission of an entire data packet (to be specific, the packet header part and a data part). This is not limited herein. In addition, the data packet may also be referred to as a packet, a data packet, or the like in some scenarios. Generally, whether to enable a compression function may be determined by an access network device or a terminal device based on a service feature, a service QoS requirement, a network load status, or the like. For example, if a packet header proportion of a data packet in a voice service is large, the access network device or the terminal device may enable the header compression function for a radio bearer of the voice service; or when network load is heavy or network resources are insufficient, the header compression function may be enabled for radio bearers of some services. This is not limited herein. Generally, if the transmitting side enables the compression function, the receiving side correspondingly enables a decompression function; if the transmitting side disables the compression function, the receiving side correspondingly disables the decompression function. In other words, the compression function of the transmitting side and the decompression function of the receiving side may be enabled or disabled at the same time, that is, the compression function and the decompression function are used together. In this embodiment of this application, a network device that enables the compression function may be referred to as a compression end, and a network device that enables the decompression function is referred to as a decompression end. In this embodiment of this application, that the transmitting side enables the compression function may be understood as that the transmitting side compresses a to-be-sent data packet, and then sends the compressed data packet to the receiving side. In this embodiment of this application, that the transmitting side disables the compression function may be understood as that the transmitting side does not compress the to-be-sent data packet, but sends the complete data packet to the receiving side.

This is not limited herein. That the compression function is not enabled may also be described as that the compression function is disabled, or described as that a compression transmission function is disabled, or the like. This is not limited herein.

It should be further noted that, the solution provided in this application is applicable to uplink transmission or downlink transmission. In downlink transmission, the access network device is the compression end, and the terminal device is the decompression end. In uplink transmission, the terminal device is the compression end, and the access network device is the decompression end. For ease of understanding, the following embodiment is described by using an example in which a packet header of a data packet is compressed during downlink transmission. In this example, a compression context is a packet header compression context. In addition, the data packet in this embodiment of this application may also be described as a packet. The packet header in this embodiment of this application may also be described as a header. A data packet with an uncompressed packet header in this embodiment of this application may be described as a full-header data packet, a complete packet header data packet, or the like. This is not limited herein. A data packet with a compressed packet header in this embodiment of this application may be described as a compressed header data packet, or may be described as a compressed packet, or may be described as a compressed packet header data packet. This is not limited herein. The packet header compression context in this application may also be described as a header compression context, or may be described as a context. This is not limited herein. A header compression context identifier in this application may also be described as a packet header compression context identifier, or may be described as a context identifier, or may be described as a context index, a context index value, or an index value. This is not limited herein.

The following describes in detail, with reference to more accompanying drawings, the technical solutions provided in this application.

Figure 5:
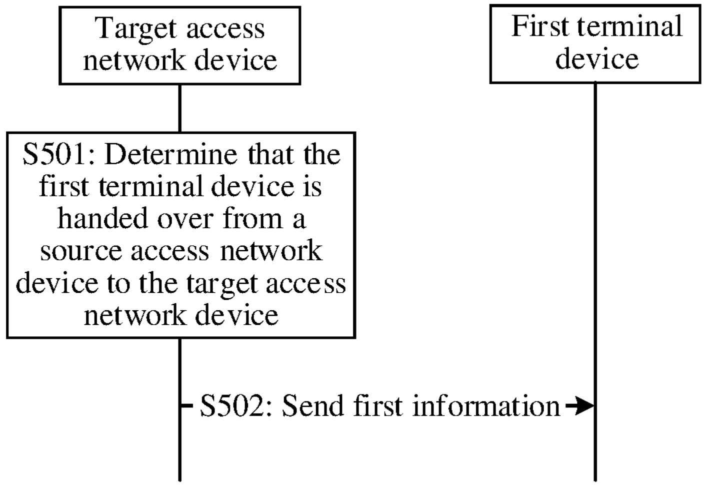
FIG. 5 is a schematic flowchart of a communication method according to an embodiment of this application.

FIG. 5 is a schematic flowchart of a communication method according to an embodiment of this application. As shown in FIG. 5, the method includes the following step S501 and step S502. The method shown in FIG. 5 may be performed by a target access network device, or the method shown in FIG. 5 may be performed by a chip in the target access network device. This is not limited herein. For ease of description, the following uses the target access network device as an example for description.

S501: The target access network device determines that a first terminal device is handed over from a source access network device to the target access network device.

In some feasible implementations, the target access network device determines that the first terminal device is handed over from the source access network device to the target access network device. A time point when the first terminal device is handed over from the source access network device to the target access network device described above may be a time point when the first terminal device prepares to be handed over from the source access network device to the target access network device (that is, before the handover), or in a handover process in which the first terminal device is handed over from the source access network device to the target access network device (that is, during the handover process), or after the first terminal device is successfully handed over from the source access network device to the target access network device (that is, after the handover). This is not limited herein. For example, refer to FIG. 3. When receiving a handover request message from the source access network device, the target access network device may determine that the handover procedure starts. After determining that random access succeeds, the target access network device may determine that the handover procedure ends. Alternatively, when receiving an RRC reconfiguration complete message from the source access network device, the target access network device may determine that the handover procedure ends. This is not limited herein.

S502: The target access network device sends first information to the first terminal device.

In some feasible implementations, when determining that the first terminal device is handed over from the source access network device to the target access network device, the target access network device may send the first information to the first terminal device. Specifically, for a target access network device that enables a compression function, the target access network device may send the first information to the first terminal device before the first terminal device is handed over from the source access network device to the target access network device, or when the first terminal device prepares to be handed over from the source access network device to the target access network device; may send the first information to the first terminal device in the handover process in which the first terminal device is handed over from the source access network device to the target access network device; or may send the first information to the first terminal device after the first terminal device is successfully handed over from the source access network device to the target access network device.

The first information may be transmitted in a PTM transmission manner, or may be transmitted in a PTP transmission manner, or the like. This is not limited herein. Specifically, when the target access network device sends the first information in the PTM transmission manner, all terminal devices served by the target access network device, to be specific, the first terminal device and another terminal device that previously receives an MBS service from the target access network device, can receive the first information. When the target access network device sends the first information to the first terminal device in the PTP transmission manner, only the first terminal device can receive the first information, and the another terminal device that previously receives the MBS service from the target access network device cannot receive or cannot obtain the first information.

The first information indicates a first packet header compression context, and the first packet header compression context is for compressing or decompressing a packet header of a data packet. In this embodiment of this application, before and after the first terminal device is handed over, data packets transmitted by the target access network device belong to a same MBS service, and the MBS service may include at least one MBS service.

Figure 6:
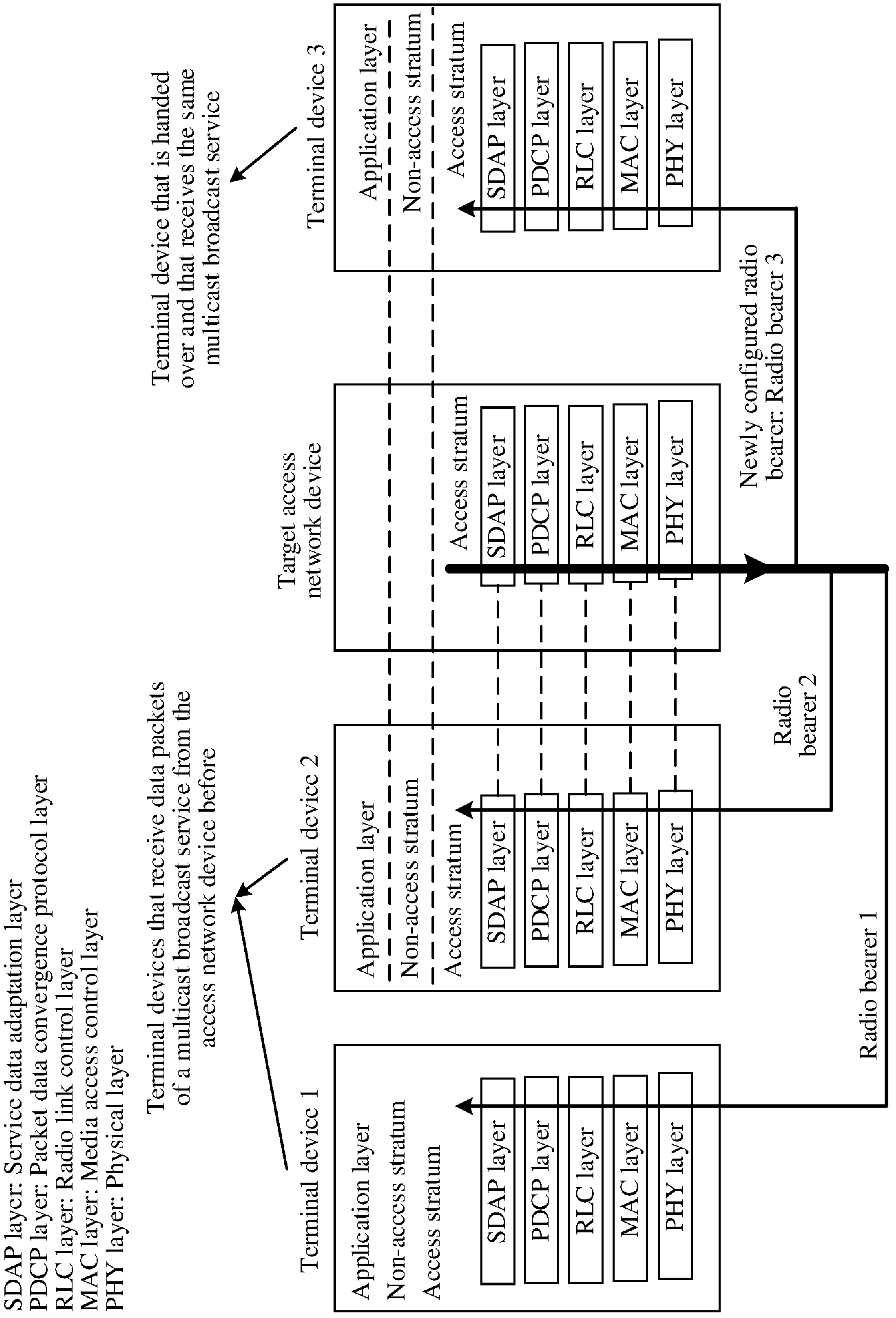
FIG. 6 is a schematic diagram of a radio bearer between an access network device and a terminal device according to an embodiment of this application.

Generally, a radio bearer may be established between the access network device and each terminal device to transmit information such as data and signaling. For a terminal device that receives the MBS service, after the terminal device is handed over from the source access network device to the target access network device, the target access network device needs to configure a new radio bearer for the handed-over terminal device, namely, the first terminal device. For example, refer to FIG. 6. FIG. 6 is a schematic diagram of a radio bearer between an access network device and a terminal device according to an embodiment of this application. As shown in FIG. 6, a terminal device 1 and a terminal device 2 are terminal devices that receive multicast broadcast service data packets from the target access network device before a terminal device 3 is handed over. A radio bearer between the terminal device 1 and the target access network device is a radio bearer 1, and a radio bearer between the terminal device 2 and the target access network device is a radio bearer 2. The terminal device 3 is a terminal device that is handed over to the target access network device to receive the same multicast broadcast service. That is, the terminal device 1, the terminal device 2, and the terminal device 3 are terminal devices that receive the same multicast broadcast service. Therefore, after the terminal device 3 is handed over from the source access network device to the target access network device, the target access network device needs to configure a new radio bearer (a radio bearer 3 shown in FIG. 6) for the handed-over terminal device 3. The three radio bearers may be used to transmit same MBS data packets. Generally, the compression function is configured and/or performed at a radio bearer granularity. In other words, different radio bearers may be configured with mutually independent compression functions. For the example in FIG. 6, from a perspective of the terminal device, radio bearers for receiving data packets by different terminal devices are different. However, from a perspective of a base station, a base station side may transmit data packets to three different terminal devices by using a same PTM transmission path in a same radio bearer. Therefore, the compression function is uniformly performed for different devices, and the decompression function is independently performed for different devices. It may be understood that PTM transmission paths of the three radio bearers share a set of protocol stacks on a base station side for unified processing. Specifically, the PTM transmission paths share a same PDCP entity, and therefore share a compression function. Before the terminal device 3 is handed over, the base station side uses the set of protocol stack (namely, a radio bearer on the base station side) to transmit MBS data packets to the terminal devices 1 and 2, and performs header compression on the data packets by using an established header compression context. After the terminal device 3 is handed over, the base station side uses the set of protocol stack (namely, the radio bearer on the base station side) to transmit MBS data packets to the terminal devices 1 to 3, but stops performing header compression on the data packets by using the established packet header compression context, and establishes a new packet header compression context for subsequent header compression on the MBS data packets.

If the target access network device sends the first information to the first terminal device before, during, or after the handover of the first terminal device, that the target access network device sends the first information to the first terminal device may be understood as that the target access network device carries (or bears) the first header compression context in a data packet with an uncompressed packet header, and sends the data packet to the first terminal device; or it may be understood as that the target access network device carries, in a data packet with an uncompressed packet header, the first information indicating the first header compression context, and sends the data packet to the first terminal device.

Optionally, the first header compression context may alternatively be carried in signaling. To be specific, the first information indicating the first header compression context may be carried in signaling, and is sent to the first terminal device. For example, the involved signaling may be a media access control control element (MAC control element, MAC CE), radio resource control (RRC) signaling, a packet data convergence protocol control protocol data unit (PDCP control protocol data unit, PDCP control PDU), or the like. This is not limited herein.

Optionally, if the target access network device sends the first information to the first terminal device during the handover process of the first terminal device, that the target access network device sends the first information to the first terminal device may be understood as that the target access network device may send the first information to the first terminal device via the source access network device, where the first information is carried in a handover command. In other words, when the target access network device sends the first information in the handover process, the first information may be carried in a handover configuration. Specifically, for ease of understanding, refer to FIG. 3. As shown in FIG. 3, after receiving a handover request message (or another Xn interface message) from the source access network device, the target access network device may determine, based on the handover request message, whether the terminal device needs to receive the MBS service. In this embodiment of this application, an existing field or a newly added field in the handover request message may indicate the MBS service that the first terminal device needs to receive. It may be understood that, if the compression function is enabled for transmission of the MBS service (or a radio bearer corresponding to the MBS service) in the target access network device, the target access network device may indicate the first information corresponding to the MBS service or the radio bearer by using an existing field or a newly added field in a handover request response message, or described as a handover acknowledgment message, or described as a handover request acknowledgment message, sent to the source access network device, to send the handover request response message including the first information to the source access network device. After receiving the handover request acknowledgment message, the source access network device may send or transparently transmit, to the first terminal device by using the handover command, information carried in the handover request acknowledgment message. The information carried in the handover request acknowledgment message may include the first information and the like. This is not limited herein.

After receiving the handover command, the first terminal device may update, replace, refresh, or overwrite, based on the first packet header compression context indicated by the first information in the handover command, a header compression context established in the source access network device. It may be understood that, if the source access network device does not enable the compression function, correspondingly, the first terminal device does not enable the decompression function either, because the compression function and the decompression function are both disabled or enabled. Therefore, the first terminal device does not have a context established before the handover. Based on this, that the first terminal device establishes the first packet header compression context based on the first information may be as follows: After receiving the handover command, the first terminal device may establish, create, or add, based on the first information in the handover command, the first packet header compression context indicated by the first information. If the source access network device enables the compression transmission function, that the first terminal device establishes the first packet header compression context based on the first information may be as follows: The first terminal device replaces, updates, refreshes, or overwrites, based on the first information, the packet header compression context established in the first terminal device with/to the first packet header compression context. The packet header compression context established by the first terminal device may be a packet header compression context synchronized with that of the source access network device when the first terminal device receives the MBS service from the source access network device. In other words, the first terminal device may delete the header compression context established when the first terminal device receives the MBS service from the source access network device, and then establish the first packet header compression context based on the first information received from the target access network device. The deleting herein may be releasing, discarding, or skipping using the established compressed context. Therefore, after subsequently determining that the first terminal device is successfully handed over to the target access network device, the target access network device may compress a packet header of a data packet by using the first packet header compression context, namely, the new header compression context, to generate a compressed header data packet and send the compressed header data packet to all terminal devices served by the target access network device. All the terminal devices served by the target access network device are the first terminal device and another terminal device that previously receives the MBS service from the target access network device. Correspondingly, for each terminal device that receives the first information and establishes a corresponding first packet header compression context based on the first information, for example, the first terminal device, the terminal device may decompress, based on the first packet header compression context synchronized with that of the target access network device, namely, the new header compression context, a data packet with a compressed packet header, namely, a compressed header data packet, received from the target access network device.

The foregoing data packet with the uncompressed packet header, the MAC CE, the RRC signaling, the PDCP control PDU, the handover request message, or the handover command for carrying the first information may further include information such as a header compression context identifier (a context identifier for short for ease of description) corresponding to each packet header compression context or an index value. This is not limited herein. One header compression context corresponds to one context identifier. Therefore, after the first terminal device receives the data packet with the uncompressed packet header, the MAC CE, the RRC signaling, the PDCP control PDU, or the handover command, the first terminal device may store a correspondence between the first packet header compression context and the corresponding context identifier, so that when subsequently receiving the data packet with the compressed packet header, the first terminal device determines, based on a context identifier carried in the data packet with the compressed packet header, a corresponding first packet header compression context to decompress the compressed header data packet. It may be understood that, the first information may include a plurality of packet header compression contexts and a plurality of corresponding context identifiers, where each packet header compression context is for compressing and decompressing a corresponding packet header.

In this embodiment of this application, before the terminal device is successfully handed over to the target access network device, in the handover process, or after the terminal device is handed over to the target access network device, the first information is sent to the handed-over first terminal device, so that the first terminal device establishes a corresponding context based on the first information. In this way, the header compression context of the first terminal device after the handover is synchronized with that of the target access network device, and the first terminal device can correctly decompress the compressed header data packet received from the target access network device. This improves communication reliability. Optionally, if the target access network device updates the header compression context of the terminal device by using the handover configuration in the handover process, the header compression context of the first terminal device after the handover can also remain synchronized with that of the target access network device, and the first terminal device can correctly decompress the compressed header data packet received from the target access network device. This helps improve communication reliability.

Figure 7:
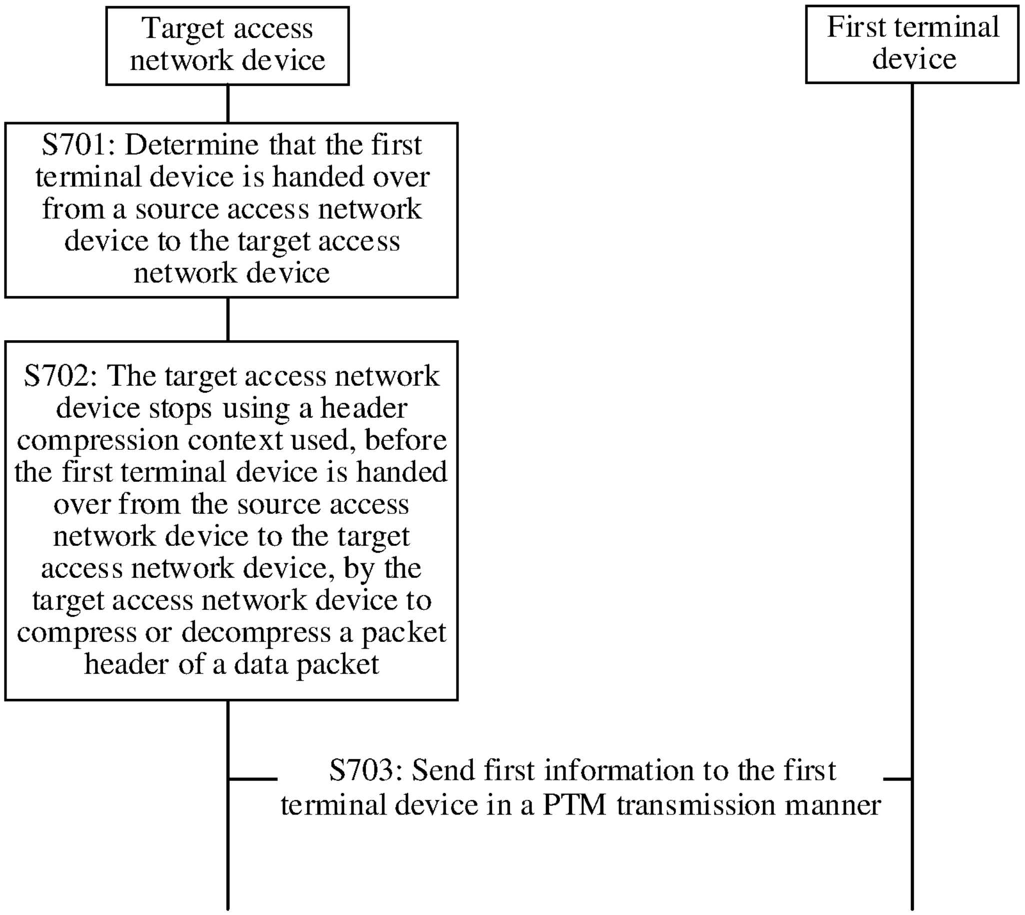
FIG. 7 is another schematic flowchart of a communication method according to an embodiment of this application.

FIG. 7 is another schematic flowchart of a communication method according to an embodiment of this application. As shown in FIG. 7, the method includes the following step S701 to step S703. The method shown in FIG. 7 may be performed by a target access network device, or the method shown in FIG. 7 may be performed by a chip in the target access network device. This is not limited herein. For ease of description, the following uses the target access network device as an example for description.

S701: The target access network device determines that a first terminal device is handed over from a source access network device to the target access network device.

For descriptions of step S701 in this embodiment of this application, refer to the descriptions of step S501 in the embodiment corresponding to FIG. 5. Details are not described herein again.

S702: The target access network device stops using a header compression context used, before the first terminal device is handed over from the source access network device to the target access network device, by the target access network device to compress or decompress a packet header of a data packet.

In some feasible implementations, the target access network device may further stop using a header compression context used, before the first terminal device is handed over from the source access network device to the target access network device, by the target access network device to compress the packet header of the data packet, because the first terminal device does not establish the header compression context of the target access network device after being handed over. Therefore, the target access network device needs to re-establish, or establish and store the context. For ease of description, in this embodiment of this application, the context re-established by the target access network device may be described as a first packet header compression context, and the first packet header compression context is sent to all terminal devices including the first terminal device, that is, the first packet header compression context is sent in a PTM transmission manner.

It should be noted that the foregoing "stop using" may be understood as deleting, resetting, refreshing, skipping using, or no longer using. Different descriptions are interchangeable, and this is not limited in this application. In this way, after stopping using the context used by the target access network device before the handover and before the target access network device determines that the first terminal device establishes the first packet header compression context, to avoid affecting normal transmission of an MBS service, if the target access network device needs to send a data packet, the target access network device may send a data packet with an uncompressed packet header, that is, not enable a compression function, or disable the compression function. In an embodiment, that the target access network device determines that the first terminal device establishes the first packet header compression context may alternatively be that the target access network device determines that the first terminal device successfully establishes the first packet header compression context. From a perspective of air interface transmission, handover of the first terminal device causes a target access network device that is transmitting an MBS data packet in a compression manner to change to a state of transmitting an MBS data packet in a non-compression manner. That is, the sent MBS data packet changes from a data packet with a compressed packet header to a data packet with an uncompressed packet header.

S703: The target access network device sends first information to the first terminal device in a PTM transmission manner.

In some feasible implementations, for a target access network device that enables the compression function, the target access network device may send the first information to the first terminal device in the PTM transmission manner when the first terminal device prepares to be handed over from the source access network device to the target access network device; may send the first information to the first terminal device in the PTM transmission manner in the handover process in which the first terminal device is handed over from the source access network device to the target access network device; or may send the first information to the first terminal device in the PTM transmission manner after the first terminal device is successfully handed over from the source access network device to the target access network device.

That the target access network device sends the first information to the first terminal device in the PTM transmission manner may be understood as that the target access network device carries or bears the first header compression context in a data packet with an uncompressed packet header, and sends the data packet to a first access network device in the PTM transmission manner; or it may be understood as that the target access network device carries, in a data packet with an uncompressed packet header, the first information indicating the first header compression context, and sends the data packet to the first terminal device in the PTM transmission manner. Optionally, the first header compression context may alternatively be carried in signaling. To be specific, the first information indicating the first header compression context may be carried in signaling, and is sent to the first terminal device in the PTM transmission manner. For example, the involved signaling may be a media access control control element (MAC control element, MAC CE), radio resource control (RRC) signaling, a packet data convergence protocol control protocol data unit (PDCP control protocol data unit, PDCP control PDU), or the like. This is not limited herein.

The foregoing data packet with the uncompressed packet header or signaling for carrying the first information may further include information such as a header compression context identifier, or a context identifier, corresponding to a packet header compression context or an index value. This is not limited herein. One header compression context corresponds to one context identifier. Therefore, after the first terminal device receives the data packet with the uncompressed packet header or the signaling, the first terminal device may store a correspondence between the packet header compression context and the corresponding context identifier included in the data packet with the uncompressed packet header or the signaling, so that when subsequently receiving a data packet with a compressed packet header, the first terminal device determines, based on a context identifier carried in the data packet with the compressed packet header, a corresponding first packet header compression context to decompress the compressed header data packet. It may be understood that, the first information may include a plurality of packet header compression contexts and a plurality of corresponding context identifiers, where each packet header compression context is for compressing and decompressing a corresponding packet header.

It may be understood that, although the target access network device may start sending the first information before, during, or after the handover, for the handed-over terminal device, namely, the first terminal device, the first terminal device can receive the first information only after the handover is completed, to establish the first packet header compression context based on the first information. If the source access network device enables the compression transmission function, that the first terminal device establishes the first packet header compression context based on the first information may be as follows: The first terminal device updates, based on the first information, a packet header compression context established in the first terminal device to the first packet header compression context. The packet header compression context established by the first terminal device may be a packet header compression context synchronized with that of the source access network device when the first terminal device receives the MBS service from the source access network device. In other words, the first terminal device may delete, release, or discard the header compression context established when the first terminal device receives the MBS service from the source access network device, and then establish the first packet header compression context based on the first information received from the target access network device. If the source access network device does not enable the compression transmission function, the first terminal device does not establish the header compression context associated with the MBS service when receiving the MBS service from the source access network device. Therefore, that the first terminal device establishes the first packet header compression context based on the first information may be as follows: The first terminal device newly establishes or creates the first packet header compression context in the first terminal device based on the first information.

Correspondingly, for a terminal device other than the first terminal device, that is, another terminal device that originally receives the service from the target access network device, that is, another terminal device that previously receives the MBS service from the target access network device, because the first information is sent in the PTM transmission manner in this embodiment of this application, the terminal device may also receive the first information. Therefore, the terminal device may continuously update, based on the received first information, an established context to the first packet header compression context indicated by the latest or newest received first information. Alternatively, it may be understood as that, the terminal device may first compare whether the first packet header compression context indicated by the first information received this time is the same as a header compression context established before the first terminal device is handed over or based on first information received previously, and if the first packet header compression context is different from the header compression context established before the first terminal device is handed over or based on the first information received previously, the terminal device replaces, with the first packet header compression context, the header compression context established before the first terminal device is handed over or based on the first information received previously.

After the target access network device determines that the first terminal device finishes establishing the first packet header compression context, the target access network device may start to compress a packet header corresponding to the first packet header compression context, that is, enable the compression function. The target access network device in this embodiment of this application sends the first information in the PTM transmission manner. Therefore, generally, the compression function can be enabled only after the target access network device determines that all terminal devices served by the target access network device, including the handed-over first terminal device and another terminal device that originally receives a service from the target access network device, have established a header compression context synchronized with that of the target access network device.

For example, refer to FIG. 4. An access network device 1 shown in FIG. 4 is the source access network device, an access network device 2 is the target access network device, UE 3 is the first terminal device, and other terminal devices that previously receive the MBS service from the target access network device are UE 4 and UE 5. Therefore, before the target access network device sends the first information, the target access network device may stop using a header compression context that is previously synchronized with that of the UE 4 and the UE 5 to compress a data packet that needs to be sent. Instead, when a data packet needs to be sent, the target access network device sends a data packet with an uncompressed packet header, and does not perform header compression on the packet header of the data packet until it is ensured that all terminal devices, to be specific, the UE 3, the UE 4, and the UE 5 shown in FIG. 4, have established header compression contexts synchronized with that of the target access network device. It may be understood that the compressed header data packet includes a context identifier. Therefore, for each terminal device served by the target access network device, the terminal device may determine a corresponding first packet header compression context based on the context identifier included in the compressed header data packet, to decompress the compressed header data packet based on the determined first packet header compression context.

It may be understood that, in this embodiment, the header compression context used by the first terminal device before the handover stops being used, and the first packet header compression context is re-established. Therefore, from an air interface transmission perspective, the first packet header compression context is not necessarily the same as the header compression context used by the first terminal device before the handover, that is, different pieces of context information corresponding to a same context identifier are not necessarily the same. Therefore, after the MBS data packet is transmitted in the compression manner again, to be specific, after the sent MBS data packet changes from a data packet with an uncompressed packet header to a data packet with a compressed packet header, a used compression context is different from the compression context used by the first terminal device before the handover.

It may be understood that, the foregoing steps are all described by using handover of one terminal device, namely, one first terminal device, as an example. Optionally, if a plurality of terminal devices, for example, a plurality of first terminal devices, are successively handed over to the target access network device, the target access network device needs to perform a plurality of reset processes for the plurality of handed-over first terminal devices, to be specific, re-perform the steps of disabling the compression transmission function and sending the first information in the PTM transmission manner. Different reset processes may be independent of each other, that is, the reset processes do not affect each other. In other words, after a terminal device is handed over, if the target access network device performs resetting and re-establishes some or all contexts, and if another terminal device is handed over in this case, the target access network device needs to perform resetting again and re-send the first information, that is, re-perform the process of establishing a header compression context. After a terminal device is handed over, when the target access network device performs resetting and does not re-establish any context, if another terminal device is handed over, in this case, the target access network device may perform resetting again or perform no operation.

Figure 8:
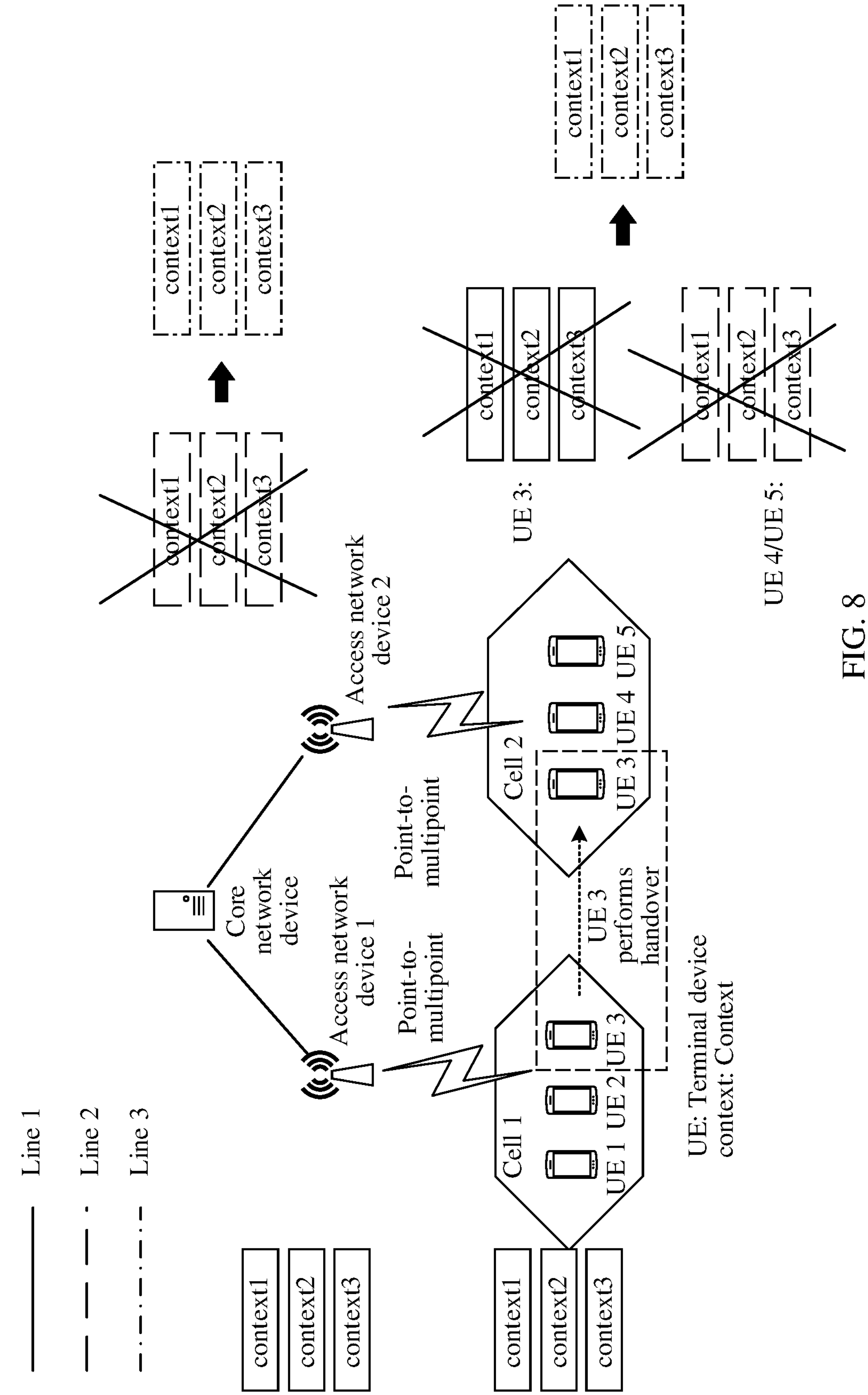
FIG. 8 is a schematic diagram of a scenario in which a target access network device resets a header compression context according to an embodiment of this application.

For example, refer to FIG. 8. FIG. 8 is a schematic diagram of a scenario in which a target access network device resets a header compression context according to an embodiment of this application. As shown in FIG. 8, at the beginning, UE 3 and other terminals (for example, UE 1 and UE 2 in FIG. 8) receive an MBS service from an access network device 1 together. The access network device 1 enables a header compression function for MBS service data packets. In a transmission process, the access network device 1 and terminal devices (for example, the UE 1, the UE 2, and the UE 3 in FIG. 8) served by the access network device 1 establish mutually synchronized header compression contexts (context1 to context3 shown by line 1 in FIG. 8), where different header compression contexts have different context identifiers. In addition, an access network device 2 enables the header compression function for the same MBS service data packets. In a transmission process, the access network device 2 and terminal devices (for example, UE 4 and UE 5 in FIG. 8) served by the access network device 2 establish mutually synchronized header compression contexts (context1 to context3 shown by line 2 in FIG. 8), where different header compression contexts have different context identifiers. When the UE 3 served by the access network device 1 is handed over from the access network device 1 to the access network device 2, due to a location change or another reason, to receive the MBS service, because a header compression context stored by the UE 3 is from the source access network device, and the target access network device and the source access network device generate header compression contexts independently, the UE 3 cannot normally decompress compressed header data packets of the MBS sent by the access network device 2. Therefore, for an access network device that performs header compression on the MBS service, when a terminal device is handed over, the access network device (namely, the target access network device) may reset an existing header compression context, and start to re-establish a context for all UEs. As shown in FIG. 8, when the target access network device determines that a terminal device (for example, the UE 3 shown in FIG. 8) is handed over from the source access network device, and the terminal device needs to receive the same MBS service data packets, to enable the terminal device to correctly decompress the MBS data packets, the target access network device may reset, refresh, or delete established header compression contexts (for example, context1 to context3 shown by line 2 in FIG. 8), in other words, not use or stop using the established header compression contexts, but re-establish header compression contexts (for example, context1 to context3 shown by line 3 in FIG. 8). That is, the target access network device sends first information to all terminal devices served by the target access network device, so that all the terminal devices update contexts to context1 to context3 shown by line 3 in FIG. 8 (as shown in FIG. 8, the UE 3 updates context1 to context3 shown by line 1 to context1 to context3 shown by line 3, and UE 4 and UE 5 update context1 to context3 shown by line 2 to context to context3 shown by line 3). After ensuring that all the terminal devices have established the header compression context synchronized with that of the access network device, the target access network device performs header compression on a packet header of a data packet.

Optionally, before determining that a first terminal device has established a first packet header compression context, the target access network device may send a data packet with a packet header compressed by using the first packet header compression context, namely, a compressed header data packet. For example, the target access network device may send the data packet with the compressed packet header to the first terminal device in a PTM transmission manner and/or a PTP transmission manner. In this case, for a first terminal device that has not established the first packet header compression context, the first terminal device may first store the compressed header data packet, and decompress the corresponding compressed header data packet after a corresponding header compression context is established. The first terminal device may determine, by using a context identifier included in the received compressed data packet, whether the corresponding header compression context has been established. In other words, that for a first terminal device that has not established the first packet header compression context, the first terminal device first stores the compressed header data packet, and decompresses the corresponding compressed header data packet after a corresponding header compression context is established may be as follows: After the first terminal device receives the compressed header data packet, the first terminal device determines whether a header compression context identifier included in the compressed header data packet exists in available header compression context information, where the available header compression context is header compression context information for compressing or decompressing the packet header of the data packet. If the header compression context identifier exists, the first terminal device decompresses the compressed header data packet based on the header compression context corresponding to the header compression context identifier. If the header compression context identifier does not exist, the first terminal device stores the compressed header data packet, and when the first terminal device successfully establishes the first header compression context corresponding to the header compression context identifier, decompresses the compressed header data packet based on the first header compression context corresponding to the header compression context identifier. It may be understood that, when the context corresponding to the compressed header data packet received by the terminal device is not established, the terminal device needs to first store the compressed data packet, and decompress the corresponding compressed header data packet after the corresponding header compression context is established. The foregoing descriptions thereof may be used as an independent embodiment, or may be used as an optional step in combination with one or more steps in this embodiment of this application. This is not limited herein.

Optionally, in this embodiment, when a sequence number of the data packet received by the terminal device is the same as a sequence number of a previously received data packet, a deviation of the sequence numbers meets a specific condition, or the sequence numbers meet an association relationship, the data packet received later cannot be simply discarded, but it needs to be further determined whether packet headers of the two data packets with the same sequence number are compressed. In other words, in comparison with a repeated detection process in which a data packet received later is discarded when a sequence number of a data packet received by the terminal device is the same as a sequence number of a previously received data packet, in the repeated detection process of the terminal device in this embodiment of this application, when the terminal device receives a plurality of data packets that include a same sequence number, a deviation of the sequence numbers meet a specific condition, or the sequence numbers meet an association relationship, whether packet headers of the data packets are compressed needs to be further considered. The sequence number of the data packet may be a sequence number of a PDCP layer. For example, the sequence number of the PDCP layer may be a PDCP sequence number (PDCP SN). Alternatively, the sequence number may be a sequence number of an SDAP layer. For example, the sequence number of the SDAP layer may be an SDAP SN. Alternatively, the sequence number may be a sequence number of an RLC layer, a MAC layer, or a PHY layer. This is not limited herein. For ease of understanding, an example in which the sequence number of the data packet is the PDCP SN number is used for description in this embodiment of this application.

For example, it is assumed that the terminal device receives, by using the PTM, a compressed header data packet whose SN=10, and then receives, by using the PTP, a full-header data packet, that is, a data packet with an uncompressed packet header, whose SN=10. In this case, an implementation is as follows: The terminal device determines whether packet headers of the two data packets are compressed, and if one packet header is compressed and the other packet header is not compressed, discards the compressed data packet, or it may be described as that the uncompressed data packet is retained, or that the compressed data packet is discarded and the uncompressed data packet is retained; if both of the packet headers are compressed or neither of the packet headers is compressed, the data packet received later is discarded, or it may be described as that the first received data packet is retained, or that the data packet received later is discarded and the first received data packet is retained. In another implementation, the terminal device determines transmission paths from which the two data packets are received, and if one data packet is received from the PTM and the other is received from the PTP, the terminal device discards the data packet received from the PTM; or if both of the two data packets are received from the PTM or the PTP, the terminal device discards the data packet received later. This is not limited herein. It may be understood that, the foregoing descriptions of the repeated detection function of the terminal device may be used as an independent embodiment, or may be used as an optional step in combination with one or more steps in this embodiment of this application. This is not limited herein. It may be understood that, the step of discarding in this application may alternatively be an optional step. To be specific, the terminal device may retain the uncompressed data packet or the first received data packet, or the terminal device skips (skips) using the compressed data packet or the data packet received later and directly uses the uncompressed data packet or the first received data packet. This is not limited herein.

It may be understood that, an execution sequence or a time sequence relationship of step S701 to step S703 may be sequentially S701, S702, and S703 (that is, the compression function is first disabled, and then the first information is sent), or may be sequentially S701, S703, and S702 (that is, the first information is first sent, and then the compression function is disabled), or may be sequentially S701 and S703/S702 (that is, step S703 in which the compression function is disabled and step S702 in which the first information is sent are performed in parallel), or the like. Examples are not listed one by one herein. Simply speaking, the foregoing numbers of the steps do not limit an execution sequence of the solution.

In this embodiment of this application, before, during, or after the handover of the terminal device, the target access network device resets, refreshes, or deletes the established header compression context, that is, stops using the context established before the handover, and re-establishes the header compression context. In this method, the header compression context of the first terminal device after the handover can remain synchronized with that of the target access network device, and the first terminal device can correctly decompress the compressed header data packet received from the target access network device. This helps improve communication reliability.

Figure 9:
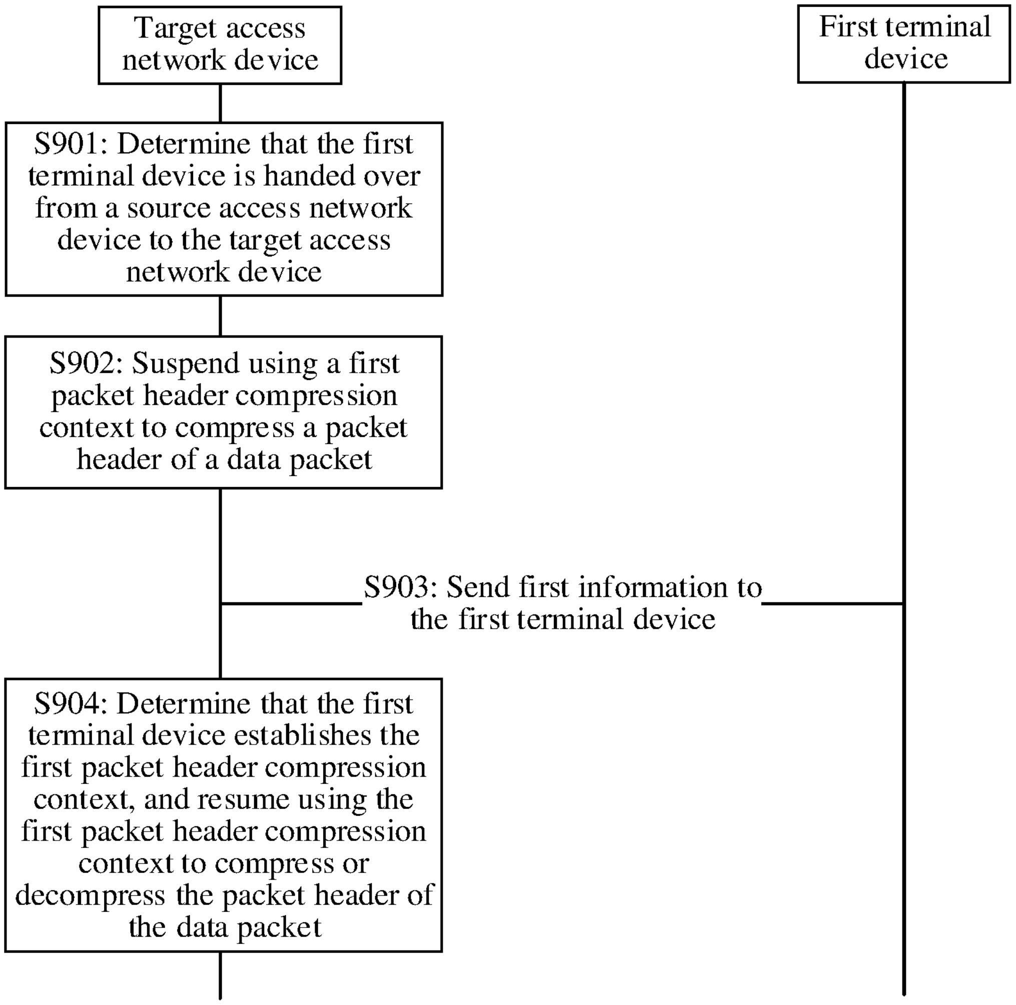
FIG. 9 is another schematic flowchart of a communication method according to an embodiment of this application.

FIG. 9 is another schematic flowchart of a communication method according to an embodiment of this application. As shown in FIG. 9, the method includes the following step S901 to step S904. The method shown in FIG. 9 may be performed by a target access network device, or the method shown in FIG. 9 may be performed by a chip in the target access network device. This is not limited herein. For ease of description, the following uses the target access network device as an example for description.

S901: The target access network device determines that a first terminal device is handed over from a source access network device to the target access network device.

For descriptions of step S901 in this embodiment of this application, refer to the descriptions of step S501 in Embodiment 1 corresponding to FIG. 5. Details are not described herein again.

S902: The target access network device suspends using the first packet header compression context to compress a packet header of a data packet.

In some feasible implementations, the target access network device may suspend using (suspend) or suspend the first packet header compression context to compress the packet header of the data packet. In this embodiment of this application, the first packet header compression context should be understood as a header compression context used, before the first terminal device is handed over from the source access network device to the target access network device, by the target access network device to compress the packet header of the data packet.

It should be noted that the foregoing "suspending using" may be understood as skipping use, temporarily not using, not continuing to use, disabling, deactivating, or it may be understood as that the target access network device sets a status of an established packet header compression context in the target access network device to an unavailable state or an invalid state. This is not limited in this application. It may be understood that, in specific implementation of the access network device, the suspending using the packet header compression context that has been established in the target access network device may alternatively occur in other forms in addition to the disabling, setting the context to the invalid state, or setting the context to the unavailable state mentioned above. For example, the access network device may alternatively mark, in a form of a mark, an identifier, or a label, whether the corresponding packet header compression context is available. For example, when a context can be used for header compression, the available context is marked; or when a context cannot be used for header compression, the unavailable context is marked. This is specifically determined based on an actual application scenario, and is not limited herein.

S903: The target access network device sends first information to the first terminal device.

In some feasible implementations, when determining that the first terminal device is handed over from the source access network device to the target access network device, the target access network device may send the first information to the first terminal device. Specifically, for a target access network device that enables a compression function, the target access network device may send the first information to the first terminal device when the first terminal device prepares to be handed over from the source access network device to the target access network device; may send the first information to the first terminal device in the handover process in which the first terminal device is handed over from the source access network device to the target access network device; or may send the first information to the first terminal device after the first terminal device is successfully handed over from the source access network device to the target access network device.

The first information may be transmitted in a PTM transmission manner, or may be transmitted in a PTP transmission manner, or the like. This is not limited herein. Specifically, when the target access network device sends the first information in the PTP transmission manner, all terminal devices served by the target access network device, to be specific, the first terminal device and another terminal device that previously receives an MBS service from the target access network device, can receive the first information. When the target access network device sends the first information to the first terminal device in the PTP transmission manner, only the first terminal device can receive the first information, and the another terminal device that previously receives the MBS service from the target access network device cannot receive or cannot obtain the first information.

The first information indicates a first packet header compression context, and the first packet header compression context is for compressing or decompressing a packet header of a data packet. The data packet in this application may be a data packet of the MBS service, or may be a data packet of another service (for example, a unicast service, a broadcast service, or a multicast service). This is specifically determined based on an actual application scenario, and is not limited herein. For ease of understanding, in this embodiment of this application, the data packet of the MBS service is used as an example for description. For example, the MBS service may be a live service, a public safety service, a batch software update service, or the like. This is not limited herein. In this embodiment of this application, the first packet header compression context should be understood as a header compression context used, before the first terminal device is handed over from the source access network device to the target access network device, by the target access network device to compress the packet header of the data packet.

If the target access network device sends the first information to the first terminal device before, during, or after the handover of the first terminal device, that the target access network device sends the first information to the first terminal device may be understood as that the target access network device carries or bears the first header compression context in a data packet with an uncompressed packet header, and sends the data packet to the first access network device; or may be understood as that the target access network device carries, in a data packet with an uncompressed packet header, the first information indicating the first header compression context, and sends the data packet to the first terminal device. Optionally, the first header compression context may alternatively be carried in signaling. To be specific, the first information indicating the first header compression context may be carried in signaling, and is sent to the first terminal device. For example, the involved signaling may be a media access control control element (MAC control element, MAC CE), radio resource control (RRC) signaling, a packet data convergence protocol control protocol data unit (PDCP control protocol data unit, PDCP control PDU), or the like. This is not limited herein.

S904: The target access network device determines that the first terminal device establishes the first packet header compression context, and resumes using the first packet header compression context to compress or decompress the packet header of the data packet.

In some feasible implementations, the target access network device determines that the first terminal device establishes the first packet header compression context, and resumes using the first packet header compression context to compress or decompress the packet header of the data packet. Herein, a manner in which the target access network device determines that the first terminal device has established or successfully established a header compression context may be as follows: ①: When the target access network device sends a same header compression context for N consecutive times, the target access network device may consider by default or determine that the first terminal device has successfully established the header compression context. ②: When the target access network device receives feedback information that is for the compression context and that is from the first terminal device, the target access network device may determine that the first terminal device has successfully established the header compression context, where the feedback information includes a context identifier, and indicates that establishment of a header compression context corresponding to the context identifier is completed.

Optionally, before the target access network device determines that the first terminal device establishes the first packet header compression context, to avoid affecting normal transmission of the MBS service, if the target access network device needs to send a data packet, the target access network device may send a data packet with an uncompressed packet header, and may not resume using the first packet header compression context to compress the packet header of the data packet until the target access network device determines that the first terminal device establishes the first packet header compression context.

The resuming using the first packet header compression context to compress the packet header of the data packet may be as follows: When the target access network device determines that the first terminal device has established a header compression context, where for example, a header compression context 1 is used as an example for description, the target access network device may set a status of the header compression context 1 to an available state, an effective state, or re-enable the header compression context 1, and start to perform header compression on a packet header of a data packet corresponding to the header compression context 1. By analogy, when statuses of all established contexts in the target access network device are changed to available, effective, or enabled, the target access network device may perform header compression on data packets corresponding to all the contexts, to send data packets with compressed packet headers. It may be understood that, the process of compressing a data packet corresponding to an established packet header compression context when it is determined that the first terminal device establishes, successfully establishes, or has established the packet header compression context described in this embodiment of this application may be used as an independent embodiment, or may be used as an optional step in combination with one or more steps in this embodiment of this application. This is not limited herein.

In this embodiment of this application, due to handover of the first terminal device, the target access network device first suspends using the first packet header compression context to compress a data packet, then sends the first information to the first terminal device, and after determining that the first terminal device establishes the corresponding first packet header compression context based on the first information, resumes using the first packet header compression context to compress a packet header of the data packet. Therefore, from an air interface transmission perspective, the handover of the first terminal device causes the target access network device to change from transmitting MBS data packets in a compression manner to temporarily transmitting MBS data packets in a non-compression manner. In other words, a sent MBS data packet changes from a data packet with a compressed packet header to a data packet with an uncompressed packet header. Then, after determining that the first packet header compression context in the first terminal device is established, the target access network device resumes using the first packet header compression context to compress the corresponding packet header. In other words, the sent MBS data packet changes from the data packet with the uncompressed packet header to the data packet with the compressed packet header. In this embodiment, because the target access network device suspends using (instead of stops using) the header compression context used by the first terminal device before the handover is suspended, the target access network device does not need to re-establish a header compression context, and the first packet header compression context is still the header compression context established before the handover of the first terminal device. In other words, from the air interface transmission perspective, the first packet header compression context is the same as the header compression context used by the first terminal device before the handover, that is, context information corresponding to a same context identifier is not necessarily the same. Therefore, after the MBS data packet resumes being transmitted in the compression manner, to be specific, after the sent MBS data packet changes from the data packet with the uncompressed packet header to the data packet with the compressed packet header, a used compression context is the same as the compression context used by the first terminal device before the handover.

It should be noted that, for another terminal device than the first terminal device, to be specific, a terminal device that receive MBS data packets from the target access network device before the first terminal device is handed over, because the first packet header compression context is the same as the header compression context established before the first terminal device is handed over, regardless of whether the target access network device sends the first information in the PTM transmission manner or the PTP transmission manner, the another terminal device may not update, based on the first information, the header compression context established before the handover, but may continue to use the header compression context established before the handover. Optionally, if the target access network device sends the first information in the PTM transmission manner, for the terminal device that receives MBS data packets from the target access network device before the first terminal device is handed over, the another terminal device may alternatively update, based on the first information, the header compression context established before the handover. However, in this embodiment, because the target access network device suspends using (instead of stops using) the header compression context used by the first terminal device before the handover, even if the terminal device performs the update operation, the corresponding header compression context is not changed.

Optionally, in some scenarios, for example, in a case in which only one terminal device (for example, a terminal device 3) is handed over to the target access network device in a specific time period, and it is assumed that after the terminal device 3 is handed over to the target access network device, the terminal device 3 is handed over to another access network device before all header compression context statuses of the target access network device become available, effective, or enabled, in this case, to reduce context establishment overheads, a header compression context status that is unavailable, invalid, or disabled needs to be restored to available, effective, or enabled. This is because a terminal device other than the terminal device 3 has already established a context, and now the terminal device 3 is handed over again. Naturally, the status should be restored to the original state.

Figure 10:
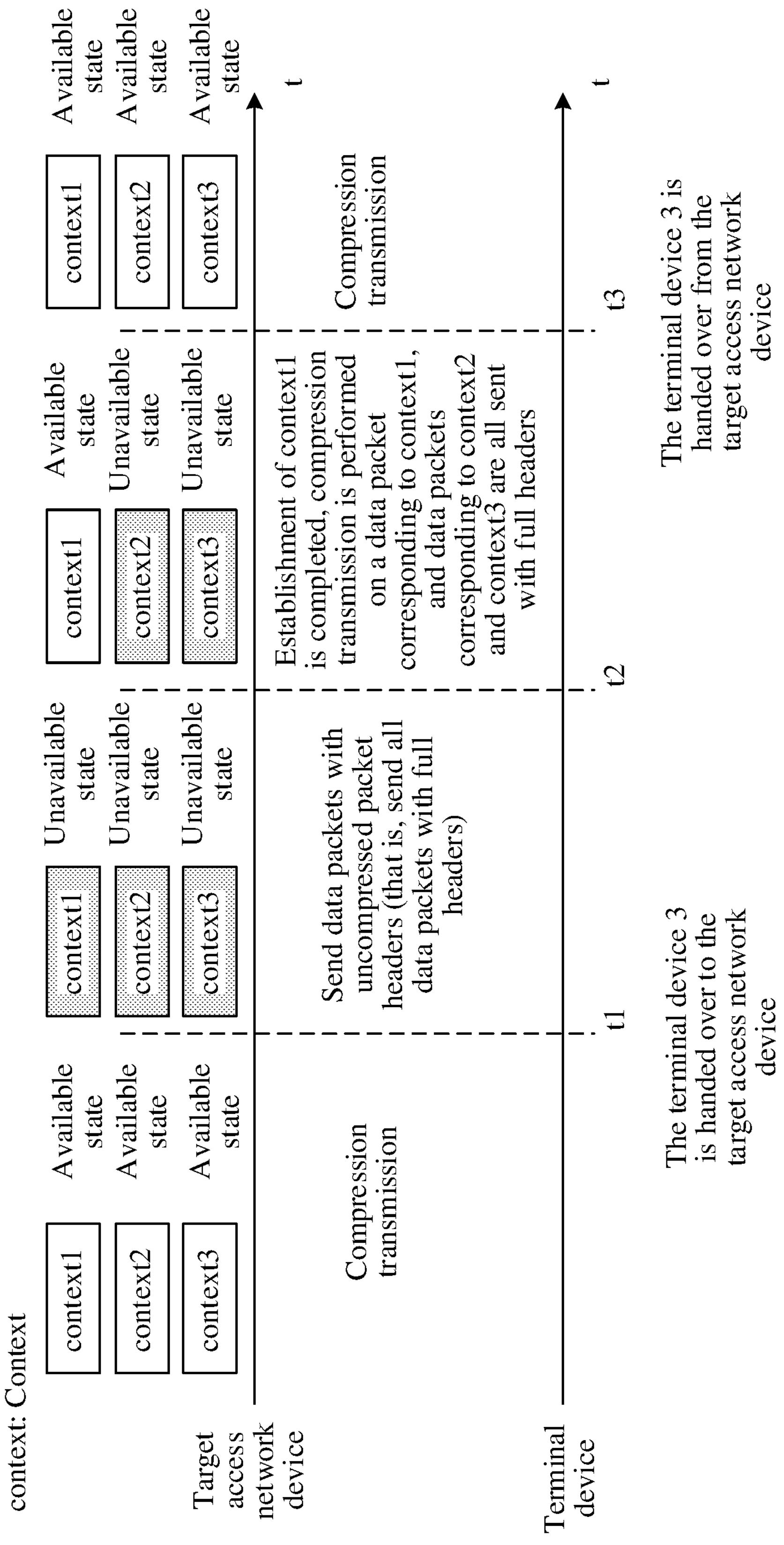
FIG. 10 is a schematic diagram of a scenario in which a header compression context status in a target access network device is affected due to handover according to an embodiment of this application.

For example, refer to FIG. 10. FIG. 10 is a schematic diagram of a scenario in which a header compression context status in a target access network device is affected due to handover according to an embodiment of this application. As shown in FIG. 10, before a moment t1, the target access network device establishes mutually synchronized header compression contexts (for example, context1 to context3 shown in FIG. 10) with terminal devices served by the target access network device. Therefore, the target access network device may compress, by using context1 to context3, data packets that need to be transmitted. At the moment t1, a terminal device (for example, a terminal device 3 shown in FIG. 10) is successfully handed over from a source access network device to the target access network device. Therefore, all established packet header compression contexts (namely, context1 to context3) in the target access network device change from available states to unavailable states. Therefore, the target access network device can send only data packets with uncompressed packet headers (that is, send all data packets with full headers). Further, the target access network device sends a header compression context to the terminal device 3, and when determining that the terminal device 3 has established or successfully established any context, sets a corresponding header compression context status in the target access network device to available, effective, or enabled, and starts to perform header compression on a packet header of a data packet corresponding to the header compression context. As shown in FIG. 10, the terminal device 3 successfully establishes context1 at a moment t2. Therefore, the target access network device may compress a data packet corresponding to context1. For contexts that are not established or have not been established by the terminal device 3 (for example, context2 and context3 shown in FIG. 10), the target access network device does not compress data packets corresponding to context2 and context3, that is, sends uncompressed data packets. At a moment t3, the terminal device 3 is handed over from the target access network device to another access network device (that is, the terminal device 3 is handed over from the target access network device). In this case, the target access network device needs to set or restore a context in an unavailable state in the target access network device to an available state. To be specific, after the moment t2, context2 and context3 are restored from the unavailable state to the available state, and context1 to context3 are used to compress the data packets that need to be transmitted.

Optionally, when the target access network device uses a solution of suspending using, suspending, or disabling a packet header compression context that has been established in the target access network device, and until the target access network device determines that the first terminal device successfully establishes any first packet header compression context, not resuming using the first packet header compression context to compress a packet header of a data packet, for a case in which a plurality of terminal devices are successively handed over to the target access network device in a specific time period, the target access network device needs to adjust header compression context statuses based on handover statuses of the plurality of terminal devices. For example, it is assumed that two terminal devices are handed over to the target access network device. For example, a terminal device 1 and a terminal device 2 are handed over to the target access network device. In this case, the target access network device needs to determine that the two terminal devices have both established header compression contexts, so that the corresponding header compression context statuses can be set to available, effective, or enabled. When the target access network device still has an unavailable, invalid, or disabled header compression contexts, but the terminal device 1 in the two terminal devices is handed over from the target access network device, the unavailable, invalid, or disabled header compression contexts still cannot be restored because the terminal device 2 has not successfully established these header compression contexts. For example, it is assumed that the terminal device 1 is handed over, and consequently context1 to context3 are unavailable, and then the terminal device 2 is handed over. In this case, even if the terminal device 1 is handed over, because the context of the terminal device 2 is not established, context1 to context3 are still unavailable.

Optionally, alternatively, before determining that the first terminal device has established the first packet header compression context, the target access network device may send a data packet, namely, a compressed header data packet, whose packet header is compressed by using the first packet header compression context. Based on this, for descriptions of a step in which when a context corresponding to the compressed header data packet received by the terminal device is not established, the terminal device needs to first store the compressed data packet, and decompress the corresponding compressed header data packet after the corresponding header compression context is established, and for descriptions of the repeated detection process of the terminal device, refer to the descriptions in FIG. 7. Details are not described herein again.

Optionally, the foregoing numbers of the steps do not limit an execution sequence of the solution.

In this embodiment of this application, before, during, or after the handover of the terminal device, the target access network device correspondingly changes the header compression context status (to be specific, the terminal device first suspends using, and then resumes using the header compression context), and determines, based on the context status (to be specific, a state of suspending being used and a state of resumes being used), whether to perform header compression on a corresponding data packet, so that the terminal device can keep synchronization of the header compression context with the target access network device after the handover, and in this way, the terminal device can correctly decompress the compressed header data packet received from the target access network device. This helps improve communication reliability.

Figure 11:
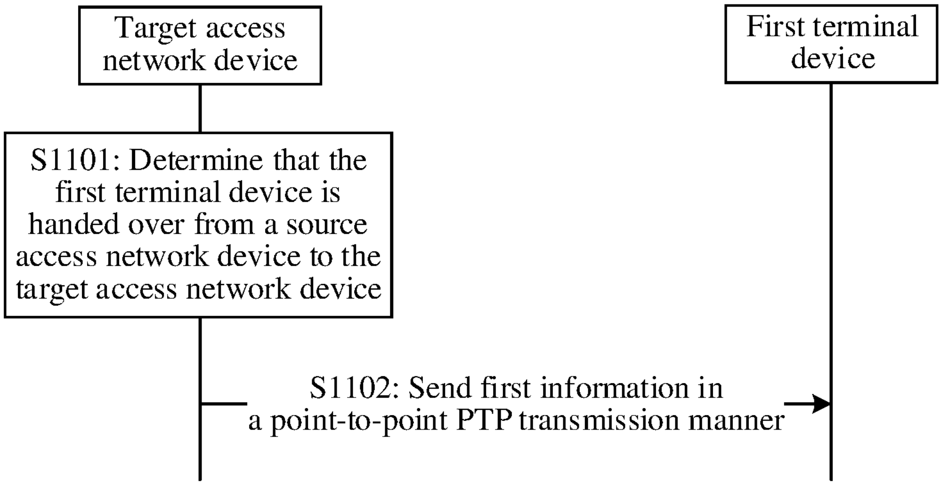
FIG. 11 is another schematic flowchart of a communication method according to an embodiment of this application.

FIG. 11 is another schematic flowchart of a communication method according to an embodiment of this application. As shown in FIG. 11, the method includes the following step S1101 and step S1102. The method shown in FIG. 11 may be performed by a target access network device, or the method shown in FIG. 11 may be performed by a chip in the target access network device. This is not limited herein. For ease of description, the following uses the target access network device as an example for description.

S1101: The target access network device determines that a first terminal device is handed over from a source access network device to the target access network device.

For descriptions of step S1101 in this embodiment of this application, refer to the descriptions of step S501 in Embodiment 1 corresponding to FIG. 5. Details are not described herein again.

S1102: The target access network device sends first information to the first terminal device in a point-to-point PTP transmission manner.

In some feasible implementations, after a terminal device (namely, the first terminal device described in this embodiment of this application) is handed over to the target access network device, the target access network device may configure a radio bearer for the terminal device. The radio bearer includes two transmission paths: a PTP transmission path and a PTM transmission path. In other words, there are two transmission paths, one is the PTP transmission path, and the other is the PTM transmission path. The PTP transmits data only for the terminal device, and the PTM transmits data for a plurality of terminal devices including the terminal device. In this embodiment of this application, the target access network device may send data packets by using one of the transmission paths (for example, the PTP or the PTM), or send data packets by using the two transmission paths (to be specific, the PTP and the PTM). Correspondingly, the first terminal device handed over to the target access network device may receive the data packets by using one of the transmission paths (for example, the PTP or the PTM), or receive the data packets by using the two transmission paths (to be specific, the PTP and the PTM). In this embodiment of this application, the data packet sent by using the PTM is a data packet with a compressed packet header (namely, a compressed data packet). Therefore, a plurality of terminal devices served by the target access network device, including the first terminal device handed over to the target access network device and another terminal device that originally receives a service from the target access network device, can receive the data packet with the compressed packet header. Optionally, the plurality of terminal devices are terminal devices that receive a same multicast broadcast service. When the first information is sent by using one transmission path (where the transmission path is the PTM), because all terminal devices can receive information sent by using the PTM transmission path, sending the first information by using the PTM has unnecessary impact on another terminal device. Based on this, this embodiment of this application proposes that for a target access network device that enables a compression function, the target access network device may send the first information to the first terminal device in the point-to-point PTP transmission manner. In this case, only the first terminal device can receive the first information, another terminal device that previously receives the MBS service from the target access network device cannot receive the first information.

The first information indicates a first packet header compression context, and the first packet header compression context is for compressing or decompressing a packet header of a data packet. The data packet in this application may be a data packet of the MBS service, or may be a data packet of another service (for example, a unicast service, a broadcast service, or a multicast service). This is specifically determined based on an actual application scenario, and is not limited herein. For ease of understanding, in this embodiment of this application, the data packet of the MBS service is used as an example for description. For example, the MBS service may be a live service, a public safety service, a batch software update service, or the like. This is not limited herein. In this embodiment of this application, the first packet header compression context should be understood as a header compression context used, before the first terminal device is handed over from the source access network device to the target access network device, by the target access network device to compress the packet header of the data packet.

Correspondingly, for the first terminal device, after the first terminal device receives the first information from the target access network device in the PTP transmission manner, the first terminal device may establish the first packet header compression context based on the first information. It may be understood that, if the source access network device enables the compression function, that the first terminal device establishes the first packet header compression context based on the first information may be as follows: The first terminal device updates, based on the first information, a packet header compression context established in the first terminal device to the first packet header compression context. The packet header compression context established by the first terminal device may be a packet header compression context synchronized with that of the source access network device when the first terminal device receives the MBS service from the source access network device. In other words, the first terminal device may delete the header compression context established when the first terminal device receives the MBS service from the source access network device, and then establish the first packet header compression context based on the first information received from the target access network device. If the source access network device does not enable the compression function, the first terminal device does not establish the header compression context associated with the MBS service when receiving the MBS service from the source access network device. Therefore, that the first terminal device establishes the first packet header compression context based on the first information may be as follows: The first terminal device newly establishes the first packet header compression context in the first terminal device based on the first information.

Optionally, if the target access network device may send data packets to the terminal device by using both the PTP transmission path and the PTM transmission path, the target access network device may send, in the PTM transmission manner or the PTP transmission manner, the data packet (namely, the compressed header data packet) whose packet header is compressed by using the first packet header compression context when sending the first information to the first terminal device in the PTP transmission manner. In other words, the target access network device may send the first information to the first terminal device in the PTP transmission manner and send the compressed header data packet in the PTM transmission manner in parallel. Correspondingly, the terminal device may receive the first information and the compressed header data packet in the PTP transmission manner and the PTM transmission manner respectively in parallel.

Optionally, if the target access network device does not support sending, or cannot send data packets to the terminal device by using both the PTP transmission path and the PTM transmission path, or it may be described as that the PTP transmission and the PTM transmission cannot be performed in parallel, but can only perform transmission in the PTP transmission manner, the target access network device may send the first information to the first terminal device in the PTP transmission manner, and then send the data packet with the compressed packet header to the first terminal device in the PTP transmission manner; or the target access network device may first send the data packet with the compressed packet header to the first terminal device in the PTP transmission manner, and then send the first information to the first terminal device in the PTP transmission manner. This is not limited herein. An advantage of this solution is that it can be ensured that a progress of receiving the compressed header data packet by the first terminal device in the PTP transmission manner is not slower than a progress of receiving the data packet by another terminal device in the PTM transmission manner. Herein, the another terminal device originally receives the data packets of the MBS service from the target access network device. It may be understood that, when the target access network device determines that the first terminal device has established the header compression context that is the same as that of the target access network device, that is, when the target access network device determines that the header compression context in the first terminal device is completely synchronized with the header compression context in the target access network device, the target access network device may switch the PTP transmission manner of the first terminal device to the PTM transmission manner by using a MAC CE or RRC signaling, so that the first terminal device can receive compressed data packets in the PTM transmission manner like the another terminal device.

Optionally, regardless of a scenario in which the target access network device can send the data packets to the terminal device by using both the PTP transmission path and the PTM transmission path, or a scenario in which the target access network device can send the data packets to the terminal device only by using the PTP transmission path, when the first terminal device receives the compressed header data packet, a first packet header compression context corresponding to a context identifier carried in the compressed header data packet may not be established, that is, the first packet header compression context of the first terminal device is not synchronized with that of the target access network device. Therefore, for a first terminal device that has not established the first packet header compression context, the first terminal device first stores the compressed header data packet, and decompresses the corresponding compressed header data packet after a corresponding header compression context is established. Alternatively, it may be understood that after the first terminal device receives the compressed header data packet, the first terminal device determines whether a header compression context identifier included in the compressed header data packet exists in available header compression context information (to be specific, the header compression context established by the first terminal device based on the first information from the target access network device), where the available header compression context is header compression context information for compressing or decompressing the packet header of the data packet. In an embodiment, if the header compression context identifier exists, the first terminal device decompresses the compressed header data packet based on the header compression context corresponding to the header compression context identifier. In another embodiment, if the header compression context identifier does not exist, the first terminal device stores the compressed header data packet, and when the first terminal device successfully establishes the first header compression context corresponding to the header compression context identifier, decompresses the compressed header data packet based on the first header compression context corresponding to the header compression context identifier. It may be understood that, when the context corresponding to the compressed header data packet received by the terminal device is not established, the terminal device needs to first store the compressed data packet, and decompress the corresponding compressed header data packet after the corresponding header compression context is established. The foregoing descriptions thereof may be used as an independent embodiment, or may be used as an optional step in combination with one or more steps in this embodiment of this application. This is not limited herein.

Figure 12:
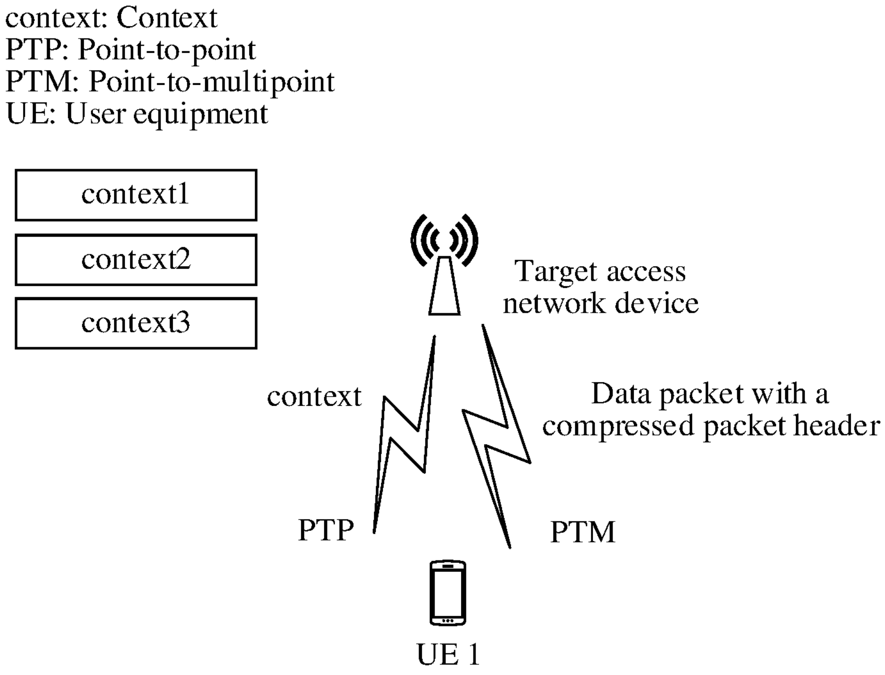
FIG. 12 is a schematic diagram of a scenario in which data packets are sent by using both PTP and PTM transmission paths according to an embodiment of this application.

For example, refer to FIG. 12. FIG. 12 is a schematic diagram of a scenario in which data packets are sent by using both PTP and PTM transmission paths according to an embodiment of this application. As shown in FIG. 12, a target access network device may send, in a PTP transmission manner, first information, or it may be described as sending a first packet header compression context, to a terminal device (for example, UE 1 shown in FIG. 12) handed over to the target access network device, and send, in a PTM transmission manner, a data packet with a compressed packet header to the UE 1 (or it may be described as sending, in a PTM transmission manner, a data packet with a compressed packet header to all terminal devices including the UE 1, where all the terminal devices include the UE 1 and another terminal device that previously receives an MBS service from the target access network device). In this case, for the UE 1, the UE 1 needs to first store the compressed header data packet, and decompress the compressed header data packet after a corresponding header compression context is established. The UE 1 may determine, by using a context identifier included in the received compressed data packet, whether the corresponding header compression context has been established.

Optionally, for the repeated detection function of the terminal device in this embodiment, when a sequence number of the data packet received by the terminal device is the same as a sequence number of a previously received data packet, a deviation of the sequence numbers meets a specific condition, or the sequence numbers meet an association relationship, the data packet received later cannot be simply discarded, but it needs to be further determined whether packet headers of the two data packets with the same sequence number are compressed. In other words, in comparison with a repeated detection process in which a data packet received later is discarded when a sequence number of a data packet received by the terminal device is the same as a sequence number of a previously received data packet, in the repeated detection process of the terminal device in this embodiment of this application, when the terminal device receives a plurality of data packets that include a same sequence number, a deviation of the sequence numbers meet a specific condition, or the sequence numbers meet an association relationship, whether packet headers of the data packets are compressed needs to be further considered or a path by using which the data packets are received needs to be further considered. The sequence number of the data packet may be a sequence number of a PDCP layer. For example, the sequence number of the PDCP layer may be a PDCP sequence number (PDCP SN). Alternatively, the sequence number may be a sequence number of an SDAP layer. For example, the sequence number of the SDAP layer may be an SDAP SN. Alternatively, the sequence number may be a sequence number of an RLC layer, a MAC layer, or a PHY layer. This is not limited herein. For ease of understanding, an example in which the sequence number of the data packet is the PDCP SN number is used for description in this embodiment of this application.

For example, it is assumed that the terminal device receives, by using the PTM, a compressed header data packet whose PDCP SN=10, and then receives, by using the PTP, a full-header data packet whose PDCP SN=10 (to help the terminal device to establish the header compression context). Because the PDCP SN in the compressed header data packet is the same as the PDCP SN in the full-header data packet (that is, both PDCP SNs are equal to 10), the terminal device needs to perform repeated detection.

For Repeated Detection:

Manner 1: Whether the packet headers of the data packets are compressed is considered.

In this case, an implementation is as follows: The terminal device determines whether packet headers of the two data packets are compressed, and if one packet header is compressed and the other packet header is not compressed, discards the compressed data packet, or it may be described as that the uncompressed data packet is retained, or that the compressed data packet is discarded and the uncompressed data packet is retained; if both of the packet headers are compressed or neither of the packet headers is compressed, the data packet received later is discarded, or it may be described as that the first received data packet is retained, or that the data packet received later is discarded and the first received data packet is retained.

Manner 2: A path by using which the data packets are received is considered.

In another implementation, the terminal device determines transmission paths from which the two data packets are received, and if one data packet is received from the PTM and the other is received from the PTP, the terminal device discards the data packet received from the PTM; or if both of the two data packets are received from the PTM or the PTP, the terminal device discards the data packet received later. This is not limited herein.

It may be understood that, the foregoing descriptions of the repeated detection function of the terminal device may be used as an independent embodiment, or may be used as an optional step in combination with one or more steps in this embodiment of this application. This is not limited herein. It may be understood that, the step of discarding in this application may alternatively be an optional step. To be specific, the terminal device may retain the uncompressed data packet or the first received data packet, or the terminal device skips (skips) using the compressed data packet or the data packet received later and directly uses the uncompressed data packet or the first received data packet. This is not limited herein.

It should be noted that, during actual implementation, the first header compression context in this embodiment of this application may be carried or born in a data packet with an uncompressed packet header to be sent to the first access network device; or it may be understood as that the first information indicating the first header compression context is carried in a data packet with an uncompressed packet header to be sent to the first terminal device. Optionally, the first header compression context may alternatively be carried in signaling (or it may be described as that the first information indicating the first header compression context may be carried in signaling). For example, the involved signaling may be a MAC CE, RRC signaling, a PDCP control PDU, or the like. This is not limited herein.

Optionally, the foregoing data packet with the uncompressed packet header for carrying the first information (or the signaling) may further include information such as a header compression context identifier (a context identifier for short for ease of description) corresponding to each packet header compression context. This is not limited herein. One header compression context corresponds to one context identifier. Therefore, after the first terminal device receives the data packet with the uncompressed packet header or the signaling, the first terminal device may store a correspondence between the first packet header compression context and the corresponding context identifier, so that when subsequently receiving a data packet with a compressed packet header, the first terminal device determines, based on a context identifier carried in the data packet with the compressed packet header, the corresponding first packet header compression context to decompress the compressed header data packet.

In this embodiment of this application, the target access network device may help the terminal device establish the header compression context by using PTP transmission before, during, or after the handover of the terminal device. Therefore, it can be ensured that after the handover of the terminal device, the terminal device can establish the first packet header compression context for the first information received by using the PTP, so that the received compressed header data packet can be correctly decompressed. This helps improve communication reliability.

The following describes in detail communication apparatuses provided in this application with reference to FIG. 13 to FIG. 16.

Figure 13:
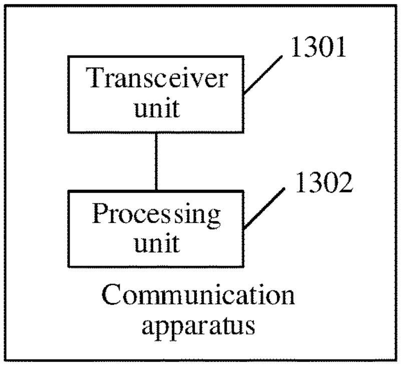
FIG. 13 is a schematic diagram of a structure of a communication apparatus according to an embodiment of this application.

FIG. 13 is a schematic diagram of a structure of a communication apparatus according to an embodiment of this application. The communication apparatus shown in FIG. 13 may be configured to perform some or all functions of the target access network device in the method embodiments described in FIG. 5 to FIG. 12. The apparatus may be the target access network device, an apparatus in the target access network device, or an apparatus that can be used together with the target access network device. The communication apparatus may alternatively be a chip system. The communication apparatus shown in FIG. 13 may include a transceiver unit 1301 and a processing unit 1302. The processing unit 1302 is configured to perform data processing. The transceiver unit 1301 is integrated with a receiving unit and a sending unit. The transceiver unit 1301 may also be referred to as a communication unit. Alternatively, the transceiver unit 1301 may be split into a receiving unit and a sending unit. The processing unit 1302 and the transceiver unit 1301 below are similar to those described herein, and details are not described below again. Specifically:

In an implementation, the processing unit 1302 is configured to determine that a first terminal device is handed over from a source access network device to the target access network device.

The transceiver unit 1301 is configured to send first information to the first terminal device, where the first information indicates a first packet header compression context, and the first packet header compression context is for compressing or decompressing a packet header of a data packet.

For another possible implementation of the communication apparatus, refer to related descriptions of functions of the access network device in the method embodiments corresponding to FIG. 5 to FIG. 12. Details are not described herein again.

Figure 14:
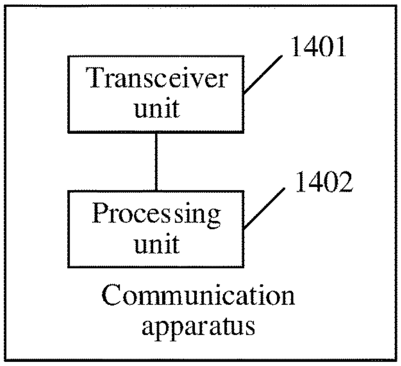
FIG. 14 is a schematic diagram of a structure of another communication apparatus according to an embodiment of this application.

FIG. 14 is a schematic diagram of a structure of a communication apparatus according to an embodiment of this application. The communication apparatus shown in FIG. 14 may be configured to perform some or all functions of the terminal device (or described as the first terminal device) in the method embodiments described in FIG. 5 to FIG. 12. The apparatus may be the terminal device, an apparatus in the terminal device, or an apparatus that can be used together with the terminal device. The communication apparatus may alternatively be a chip system. The communication apparatus shown in FIG. 14 may include a transceiver unit 1401 and a processing unit 1402. Specifically:

In an implementation, the processing unit 1402 is configured to perform handover from a source access network device to a target access network device.

The transceiver unit 1401 is configured to receive first information from the target access network device, where the first information indicates a first packet header compression context, and the first packet header compression context is for compressing or decompressing a packet header of a data packet.

For another possible implementation of the communication apparatus, refer to related descriptions of functions of the terminal device in the method embodiments corresponding to FIG. 5 to FIG. 12. Details are not described herein again.

Figure 15:
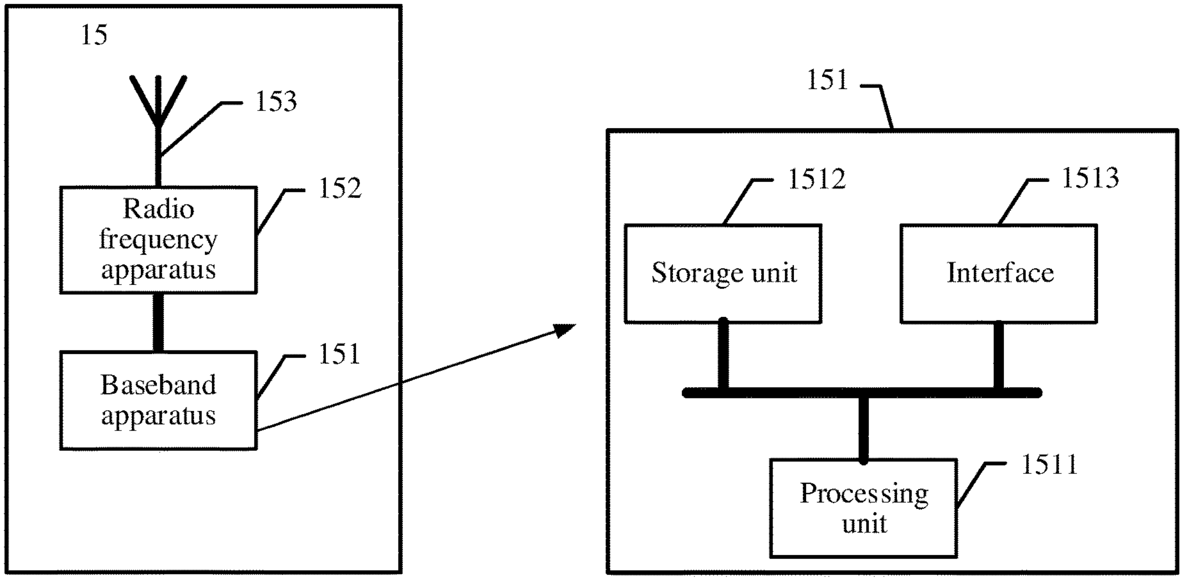
FIG. 15 is a schematic diagram of a structure of another communication apparatus according to an embodiment of this application.

FIG. 15 is a schematic diagram of a structure of another communication apparatus according to an embodiment of this application. As shown in FIG. 15, the communication apparatus may be the target access network device described in embodiments of this application, and is configured to implement functions of the target access network device in FIG. 5 to FIG. 12. A target access network device 15 includes a baseband apparatus 151, a radio frequency apparatus 152, and an antenna 153. In an uplink direction, the radio frequency apparatus 152 receives, by using the antenna 153, information sent by a terminal device, and sends the information, sent by the terminal device, to the baseband apparatus 151 for processing. In a downlink direction, the baseband apparatus 151 processes information from the terminal device and sends processed information to the radio frequency apparatus 152, and the radio frequency apparatus 152 processes the information from the terminal device and then sends processed information to the terminal device by using the antenna 153.

The baseband apparatus 151 includes one or more processing units 1511, a storage unit 1512, and an interface 1513. The processing unit 1511 is configured to support the target access network device in performing functions of the target access network device in the foregoing method embodiments. The storage unit 1512 is configured to store a software program and/or data. The interface 1513 is configured to exchange information with the radio frequency apparatus 152. The interface includes an interface circuit, and is configured to input and output information. In an implementation, the processing unit is an integrated circuit, for example, one or more ASICS, one or more DSPs, one or more FPGAs, or a combination of these types of integrated circuits. These integrated circuits may be integrated together to form a chip. The storage unit 1512 may be located in a same chip as the processing unit 1511, that is, may be an on-chip storage element. Alternatively, the storage unit 1512 may be located on a different chip from the processing unit 1511, that is, may be an off-chip storage element. The storage unit 1512 may be one memory, or may be a collective name of a plurality of memories or storage elements.

The target access network device may implement some or all of the steps in the foregoing method embodiments in a form of scheduling programs by using one or more processing units, for example, implement corresponding functions of the target access network device in FIG. 5, FIG. 7, FIG. 9, and/or FIG. 11. The one or more processing units may support radio access technologies of a same standard, or may support radio access technologies of different standards.

Figure 16:
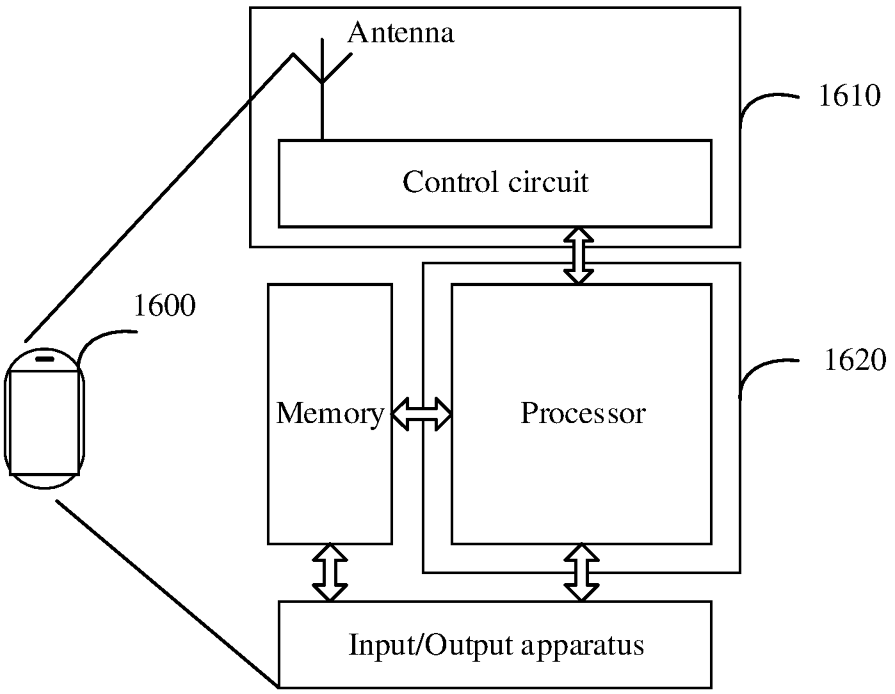
FIG. 16 is a schematic diagram of a structure of another communication apparatus according to an embodiment of this application.

FIG. 16 is a schematic diagram of a structure of another communication apparatus according to an embodiment of this application. As shown in FIG. 16, the communication apparatus may be the terminal device described in embodiments of this application, and is configured to implement functions of the terminal device in FIG. 5 to FIG. 12. For ease of description, FIG. 16 shows only main components of the terminal device 1600. As shown in FIG. 16, the terminal device 1600 includes a processor, a memory, a control circuit, an antenna, and an input/output apparatus. The processor is mainly configured to: process a communication protocol and communication data, control the entire terminal device 1600, execute a software program, and process data of the software program. The memory is mainly configured to store the software program and the data. The control circuit is mainly configured to: perform conversion between a baseband signal and a radio frequency signal, and process the radio frequency signal. The antenna is mainly configured to send and receive the radio frequency signal in a form of an electromagnetic wave. The input/output apparatus, for example, a touchscreen, a display, a microphone, or a keyboard, is mainly configured to receive data entered by a user and output data to the user.

For example, the terminal device 1600 is a mobile phone. After the terminal device 1600 is powered on, the processor may read a software program in a storage unit, explain and execute instructions of the software program, and process the data of the software program. When data needs to be sent wirelessly, the processor performs baseband processing on the to-be-sent data, and then outputs a baseband signal to the control circuit. The control circuit performs radio frequency processing on the baseband signal, and then sends a radio frequency signal to the outside in a form of an electromagnetic wave through the antenna. When data is sent to the terminal device 1600, the control circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 16 shows only one memory and one processor. In some embodiments, the terminal device 1600 may include a plurality of processors and memories. The memory may also be referred to as a storage medium, a storage device, or the like. This is not limited in this embodiment of the present invention.

In an optional implementation, the processor may include a baseband processor and a central processing unit. The baseband processor is mainly configured to process the communication protocol and the communication data. The central processing unit is mainly configured to: control the entire terminal device 1600, execute the software program, and process the data of the software program. Functions of the baseband processor and the central processing unit are integrated into the processor in FIG. 16. A person skilled in the art may understand that the baseband processor and the central processing unit each may be an independent processor, and are interconnected by using a technology such as a bus. The terminal device 1600 may include a plurality of baseband processors to adapt to different network standards, and the terminal device 1600 may include a plurality of central processing units to enhance a processing capability of the terminal device 1600. Components of the terminal device 1600 may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

In an example, the antenna and the control circuit that have a transceiver function may be considered as a transceiver unit 1610 of the terminal device 1600, and the processor that has a processing function may be considered as a processing unit 1620 of the terminal device 1600. As shown in FIG. 16, the terminal device 1600 includes the transceiver unit 1610 and the processing unit 1620. The transceiver unit may also be referred to as a transceiver, a transceiver machine, a transceiver apparatus, or the like. Optionally, a component that is in the transceiver unit 1610 and that is configured to implement a receiving function may be considered as a receiving unit, and a component that is in the transceiver unit 1610 and that is configured to implement a sending function may be considered as a sending unit. In other words, the transceiver unit 1610 includes the receiving unit and the sending unit. For example, the receiving unit may also be referred to as a receiver machine, a receiver, a receiver circuit, or the like. The sending unit may be referred to as a transmitter machine, a transmitter, a transmitter circuit, or the like.

An embodiment of this application further provides a computer-readable storage medium. The computer-readable storage medium stores instructions. When the instructions are run on a processor, method procedures in the foregoing method embodiments are implemented.

An embodiment of this application further provides a computer program product. When the computer program product runs on a processor, method procedures in the foregoing method embodiments are implemented.

A person of ordinary skill in the art may be aware that, in combination with the examples described in embodiments disclosed in this specification, units and steps may be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiments are merely examples. For example, division into the units is merely logical function division. The units described as separate components may or may not be physically separate, and components displayed as units may or may not be physical units, may be located in one position, or may be distributed on a plurality of network units. Some or all of the units may be selected based on actual requirements to achieve objectives of the solutions of the embodiments.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing computer-readable storage medium may be any usable medium that can be accessed by a computer. For example, the computer-readable medium may include but is not limited to: a random access memory (RAM), a read-only memory (ROM), a programmable read-only memory (programmable ROM, PROM), an erasable programmable read-only memory (erasable PROM, EPROM), an electrically erasable programmable read-only memory (EEPROM), a compact disc read-only memory (CD-ROM), a universal serial bus flash disk, a removable hard disk, another optical disc storage, a magnetic disk storage medium or another magnetic storage device, or any other medium that can be used to carry or store expected program code in a form of instructions or a data structure and that can be accessed by a computer. In addition, by way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

The foregoing descriptions are merely specific implementations of this application, but are not intended to limit the protection scope of embodiments of this application. Any variation or replacement readily figured out by a person skilled in the art within the technical scope disclosed in embodiments of this application shall fall in the protection scope of embodiments of this application. Therefore, the protection scope of embodiments of this application shall be subject to the protection scope of the claims.

What is claimed is:

1. A communication method, comprising:

determining that a first terminal device is handed over from a source access network device to a target access network device; and sending, to the first terminal device in a point-to-point (PTP) transmission manner, first information indicating a first packet header compression context, the first packet header compression context being configured for compressing or decompressing a packet header of a data packet;

receiving, from the first terminal device, feedback information indicating that the first packet header compression context is established at the first terminal device; and in response to the feedback information, sending, to the first terminal device, a data packet with a compressed packet header in a point-to-multipoint (PTM) transmission manner.

2. The method according to claim 1, wherein the method further comprises:

stopping using a header compression context used, before the first terminal device is handed over from the source access network device to the target access network device, by the target access network device to compress or decompress the packet header of the data packet; and establishing the first packet header compression context.

3. The method according to claim 1, wherein the method further comprises:

suspending using the first packet header compression context to compress the packet header of the data packet, wherein the first packet header compression context is a header compression context used, before the first terminal device is handed over from the source access network device to the target access network device, by the target access network device to compress or decompress the packet header of the data packet.

4. The method according to claim 3, wherein the method further comprises:

after the suspending, determining that the first terminal device establishes the first packet header compression context; and in response to the determining that the first terminal device establishes the first packet header compression context, resuming using the first packet header compression context to compress or decompress the packet header of the data packet.

5. The method according to claim 1, the method further comprising:

sending, to the first terminal device, the data packet with the compressed packet header in the PTP transmission manner as well as in the PTM transmission manner, wherein the data packet with the compressed packet in the PTP transmission manner and the data packet with the compressed packet in the PTM transmission mode are sent in parallel.

6. A communication method, comprising:

performing handover from a source access network device to a target access network device; and receiving first information from the target access network device in a point-to-point (PTP) transmission manner, wherein the first information indicates a first packet header compression context, and the first packet header compression context is configured for compressing or decompressing a packet header of a data packet;

sending, to the target access network device, feedback information indicating that the first packet header compression context is established at the first terminal device; and in response to sending the feedback information, receiving, from the target access network device, a data packet with a compressed packet header that is transmitted in a point-to-multipoint (PTM) transmission manner.

7. The method according to claim 6, wherein the method further comprises:

sending feedback information to the target access network device, wherein the feedback information indicates that a first terminal device establishes the first packet header compression context.

8. The method according to claim 6, wherein the first packet header compression context is carried in a data packet with an uncompressed packet header, the data packet with the uncompressed packet header corresponds to a first sequence number, the data packet with the compressed packet header corresponds to a second sequence number, and the first sequence number is the same as the second sequence number; and the method further comprises:

discarding the data packet with the compressed packet header.

9. The method according to claim 6, wherein the method further comprises:

before the first terminal device establishes the first packet header compression context corresponding to a first header compression context identifier, storing a data packet with a compressed packet header and the header compression context identifier; and decompressing the data packet with the compressed packet header based on the first packet header compression context corresponding to the first header compression context identifier.

10. The method according to claim 6, the method further comprising:

compressing the data packet with the compressed packet using the first packet header compression context.

11. The method according to claim 6, the method further comprising:

receiving, from the target access network device, the data packet with the compressed packet header that is transmitted in the PTP transmission manner;

selecting the data packet with the compressed packet header in the PTP transmission manner from the data packet with the compressed packet header transmitted in the PTP transmission manner and the data packet with the compressed packet header transmitted in the PTM transmission manner; and compressing the data packet with the compressed packet using the first packet header compression context.

12. A communication apparatus, wherein the communication apparatus is a target access network device and comprises at least one memory, at least one processor, and at least one transceiver, and the processor and the transceiver are configured to execute a computer program or instructions stored in at least one memory, to enable the apparatus to implement a method comprising:

determining that a first terminal device is handed over from a source access network device to the target access network device; and sending, to the first terminal device in a point-to-point (PTP) transmission manner, first information indicating a first packet header compression context, the first packet header compression context being configured for compressing or decompressing a packet header of a data packet;

receiving, from the first terminal device, feedback information indicating that the first packet header compression context is established at the first terminal device; and in response to the feedback information, sending, to the first terminal device, a data packet with a compressed packet header in a point-to-multipoint (PTM) transmission manner.

13. The apparatus according to claim 12, wherein the method further comprises:

stopping using a header compression context used, before the first terminal device is handed over from the source access network device to the target access network device, by the target access network device to compress or decompress the packet header of the data packet; and establishing the first packet header compression context.

14. The apparatus according to claim 12, wherein the method further comprises:

suspending using the first packet header compression context to compress the packet header of the data packet, wherein the first packet header compression context is a header compression context used, before the first terminal device is handed over from the source access network device to the target access network device, by the target access network device to compress or decompress the packet header of the data packet.

15. The apparatus according to claim 14, wherein the method further comprises:

after the suspending, determining that the first terminal device establishes the first packet header compression context; and in response to the determining that the first terminal device establishes the first packet header compression context, resuming using the first packet header compression context to compress or decompress the packet header of the data packet.

16. The apparatus according to claim 12, wherein the sending the first information to the first terminal device comprises:

sending, to the first terminal device, the data packet with the compressed packet header in the PTP transmission manner as well as in the PTM transmission manner, wherein the data packet with the compressed packet in the PTP transmission manner and the data packet with the compressed packet in the PTM transmission mode are sent in parallel.

* * * * *